US007466815B2

(12) United States Patent
Delaney et al.

(10) Patent No.: US 7,466,815 B2
(45) Date of Patent: Dec. 16, 2008

(54) METHODS AND SYSTEMS FOR DETECTING AND PREVENTING SIGNALING CONNECTION CONTROL PART (SCCP) LOOPING

(75) Inventors: Robert J. Delaney, Raleigh, NC (US); Todd Eichler, Wake Forest, NC (US)

(73) Assignee: Tekelec, Morrisville, NC (US)

( * ) Notice: Subject to any disclaimer, the term of this patent is extended or adjusted under 35 U.S.C. 154(b) by 1196 days.

(21) Appl. No.: 10/609,094

(22) Filed: Jun. 27, 2003

(65) Prior Publication Data

US 2004/0264675 A1    Dec. 30, 2004

(51) Int. Cl.
*H04M 7/00*    (2006.01)
(52) U.S. Cl. .................... 379/229; 379/219; 379/221.1; 379/221.08; 379/221.12; 379/221.13
(58) Field of Classification Search ................. 379/229, 379/219, 230, 221.1, 221.13, 221.08, 221.12; 370/254, 352
See application file for complete search history.

(56) References Cited

U.S. PATENT DOCUMENTS 5,862,129 A    1/1999    Bell et al.
5,889,847 A    3/1999    Copley et al.
6,421,440 B1    7/2002    Copley et al.

OTHER PUBLICATIONS

Notification of Transmittal of the International Search Report and the Written Opinion of the International Searching Authority, or the Declaration for International Application No. PCT/US04/20141 (Jul. 8, 2008).

*Primary Examiner*—Thjuan K Addy
(74) *Attorney, Agent, or Firm*—Jenkins, Wilson, Taylor & Hunt, P.A.

(57) ABSTRACT

Methods and systems for signaling connection control part (SCCP) loop detection and prevention are disclosed. A signal transfer point (STP) receives a message and performs global title translation (GTT) for the message. The STP compares the originating point code (OPC) in the signaling message with the post-GTT destination point code (DPC) in the message. If the incoming message OPC matches the post-GTT DPC, SCCP looping is detected and the message is discarded. If the incoming message OPC does not match the post-GTT DPC, the STP may correlate the incoming message OPC or the DPC to one or more additional point codes to identify the presence of SCCP looping.

35 Claims, 22 Drawing Sheets

METHODS AND SYSTEMS FOR DETECTING AND PREVENTING SIGNALING CONNECTION CONTROL PART (SCCP) LOOPING

TECHNICAL FIELD

The present invention includes methods and systems for detecting and preventing SCCP looping. More particularly, the present invention includes methods and systems for detecting and preventing SCCP looping even when the originating point code (OPC) and the post-global-title-translation (GTT) destination point code (DPC) are not the same.

RELATED ART

In packet-switched networks, circular routing or looping refers to the same message being sent back and forth repeatedly between a source and a destination. Such a phenomenon can occur due to misconfiguration of network routing tables or in routing address translation tables. Looping is undesirable because it increases network congestion and consumes processing resources in the nodes involved in circularly routed messages.

In SS7 networks, looping can occur at the message transfer part (MTP) level and at the signaling connection control part (SCCP) level. At the MTP level, looping may occur due to misconfiguration in MTP routing tables. For example, an MTP routing table may route a message with a particular destination point code to the originating point code of the node that sent the message. Such misconfiguration may occur when network nodes are managed by different service providers.

At the MTP level, the SS7 protocol specifications allow for loop detection by two methods, referred to as congestion detection and rerouting. In both methods, SS7 industry standard specifications specify that a route set test message with a priority of three may be sent from a source node to a destination node. If the route set test message is sent back to the source node, a circular route is detected and the link is failed.

Loop detection at the SCCP level is more complex than loop detection at the MTP level because of global title translation. Global title translation is the process by which the called party address stored in the SCCP portion of a message is translated into a destination point code, and the original destination point code in the MTP routing label of the message is replaced by the translated destination point code. Global title translation is frequently used when a sending node does not know the final destination point code for a signaling message. The sending node relies on one or more intermediate nodes to perform global title translation for the signaling message to determine the proper destination point code for the signaling message. Even if the MTP routing tables at all nodes between an SCCP source and SCCP destination are correct, looping can occur due to misconfiguration in an intermediate node's global title translation tables. Such misconfiguration may occur when nodes are owned by different network operators.

With the advent of local number portability where a called party can move to a different location and keep the same directory number, SCCP looping has become even more prevalent because STPs often use additional point codes, referred to as capability point codes to identify themselves for LNP purposes. Capability point codes make SCCP looping difficult to detect because the destination address of a global-title-translated message may not match the originating address in the original message, but the addresses may still correspond to the same node.

Like MTP looping, SCCP looping causes congestion between nodes and is therefore undesirable. The SS7 protocol specifications currently specify two methods for SCCP loop detection. However, both of these methods require network-wide implementation. One method is the SCCP hop counter provided by extended unit data service. In order to implement the SCCP hop counter, each node involved in loop detection is required to increment and check an SCCP hop count in an SCCP extended unit data message to determine whether the hop count exceeds a predetermined value. If the hop count exceeds a predetermined value, SCCP looping is indicated and the message is discarded. However, many network nodes do not participate in extended unit data service. As a result, using SCCP extended unit data service is unsuitable for detecting SCCP looping absent network-wide implementation of extended unit data service.

The other method described in SS7 protocol specifications for SCCP loop detection is the operations, maintenance, and administration part (OMAP) SRVT protocol. The OMAP SRVT protocol, like the extended unit data protocol, requires network-wide compliance. The problem of SCCP looping is also prevalent in IETF Sigtran protocols used to carry SCCP traffic, because such protocols carry SCCP traffic as a payload, with the exception of the SCCP user adaptation layer.

One conventional method for detecting SCCP looping in a network that does not participate in the XUDT or OMAP protocols is to use a link monitor to the signaling links between two nodes and detect the presence of looping based on link utilization. If link utilization detected by the link monitor exceeds a predetermined threshold, circular routing or looping is detected, the link is taken out of service, and the routing tables are reconfigured. Using link utilization as a signature for SCCP loop detection can be inaccurate because link utilization may increase due to legitimate non-looping traffic. Moreover, taking a link out of service is labor intensive and increases traffic on other links.

Another conventional method for detecting SCCP looping is to compare the post-GTT DPC to the inbound MTP OPC in a signaling message. While this method for SCCP loop detection will prevent some instances of SCCP looping, it is ineffective when the source and destination of an SCCP loop are not adjacent to each other. Moreover, in SS7 networks, many nodes use capability point codes and true point codes to identify each other. As a result, the OPC in the pre-GTT message and the post-GTT DPC in the outbound message may not be the same. However, the OPC and the DPC, even though they are different from each other, may indicate the same node in networks where signaling nodes use multiple point codes to identify themselves. Thus, there exists a long felt need for improved methods and systems for detecting and preventing SCCP looping.

DISCLOSURE OF THE INVENTION

The present invention includes methods and systems for detecting and preventing SCCP looping that do not require network wide implementation of complex loop detection protocols. SCCP looping according to the present invention can be implemented at a single network node or pair of nodes using loop detection logic and appropriate loop detection data identifying nodes for which SCCP loop protection is desired. In addition, the methods and systems of the present invention are capable of detecting SCCP looping when the source and destination of the SCCP loop are not adjacent to each other.

A method for detecting SCCP looping may include receiving an SCCP message and performing global title translation on the SCCP message. As a preliminary check, the post-GTT DPC in the message may be compared to the OPC in the message. If the OPC matches the DPC, then SCCP looping is indicated. If the OPC does not match the post-GTT DPC, the post-GTT DPC may be compared to one or more additional point codes to detect the presence of SCCP looping. The additional point codes may include capability point codes, true point codes, and/or secondary true point codes of nodes for which SCCP loop protection is desired. If the post-GTT DPC matches any of these additional point codes, SCCP looping may be indicated. Because such loop detection does not depend on network-wide implementation of SCCP looping procedures, the methods and systems of the present invention provide robust protection than the SCCP looping mechanism in the SS7 protocol specifications. In addition, because the present invention compares the post-GTT DPC value to point codes other than the OPC in a received signaling message, SCCP loop detection can be successful even if the post-GTT DPC and the OPC are different.

Accordingly, it is an object of the invention to provide improved methods and systems for SCCP looping that do not require network-wide implementation of loop detection procedures.

It is another object of the invention to provide methods and systems for SCCP loop detection in which point codes other than the OPC in a received signaling message are compared to the post-GTT DPC.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
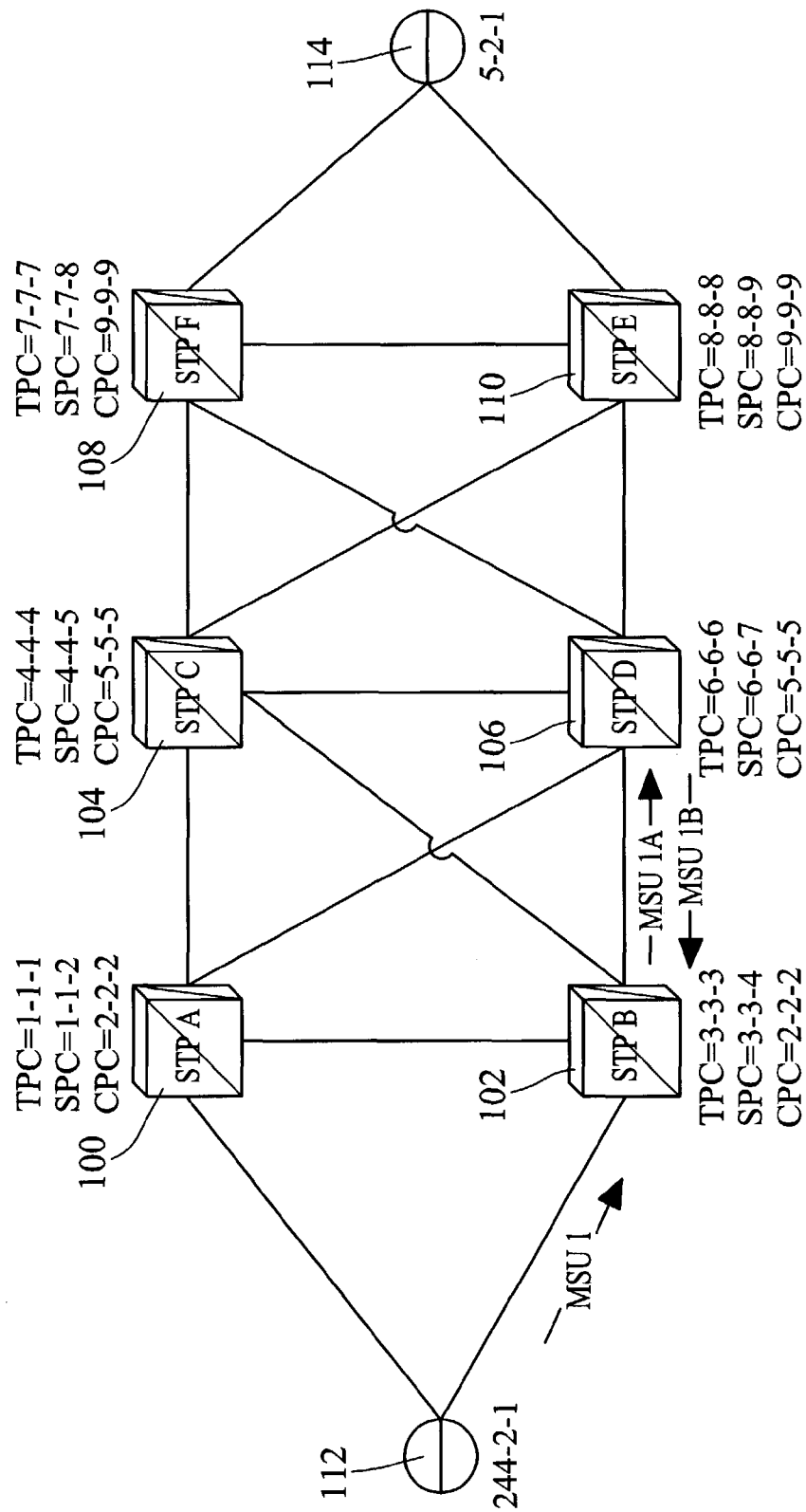
FIG. 1 is a network diagram illustrating conventional SCCP looping.

FIG. 1 is a network diagram illustrating conventional SCCP looping. Referring to FIG. 1, a plurality of STPs 100, 102, 104, 106, 108, and 110 are interconnected between an SSP 112 and an SSP 114. In the illustrated example, each STP includes a true point code (TPC), a secondary true point code (SCP), and a capability point code (CPC). True point codes and secondary true point codes are point codes that each STP uses to identify itself in the OPC fields of messages that it originates. A capability point code is a point code used by other nodes to send messages to a pair of STPs. The particular STP that processes a message addressed to its capability point code may depend on load sharing considerations.

In the illustrated example, SSP 112 originates a message, MSU 1, and sends the message to STP B 102. MSU 1 is assumed to have the following fields:

MTP OPC=244-2-1

MTP DPC=2-2-2

SCCP RI=route-on-gt

The message is assumed to be sent route on global title. When STP B 102 receives the message, STP B 102 performs an intermediate global title translation on the MSU, resulting in MSU 1A. MSU 1A, after translation, will have the following fields:

MTP OPC=3-3-3

MTP DPC=5-5-5

CGPA OPC=244-2-1

CDPA DPC=5-5-5.

When MSU 1A arrives at STP D 106, STP D 106 is assumed to have an erroneously configured global title translation table or LNP Message relay data. This may occur because STP D 106 is owned by a different network operator than STP B 102. In this example, STP D 106 is assumed to perform a looping translation. The result of the translation is MSU 1B. MSU 1B is assumed to have the following fields:

MTP OPC=6-6-6

MTP DPC=2-2-2

CGPA OPC=244-2-1

CDPA DPC=6-6-6.

STP D 106 sends the erroneously translated message to STP B 102. STP B 102 performs global title translation on MSU 1B, resulting in the same fields as listed above for MSU 1A. As a result, MSUs 1A and 1B continuously loop between STP B 102 and STP D 106. It should also be noted that the post-GTT DPC in MSU 1B does not match the OPC of MSU 1A because the MSU 1B is sent to a DPC corresponding to the capability point code of STP B 102. As a result, conventional SCCP loop detection logic that compares the post-GTT DPC with the OPC of a received message is ineffective for stopping the SCCP looping illustrated in FIG. 1.

According to one exemplary implementation of the invention, a signal transfer point may solve the SCCP looping issue illustrated in FIG. 1 without requiring SCCP protocol changes or network-wide implementation of such changes. In the simple example illustrated in FIG. 1, one solution to prevent SCCP looping is not using capability point codes and instituting a check to determine whether the incoming MSU's OPC is the same as the post-GTT DPC. However, many domestic operators use capability codes not only for SCCP, but also for LNP. Thus, in such networks, one possible solution to preventing SCCP looping is to correlate capability point codes associated with SCCP or database application, such as LNP, with true/secondary point codes.

For example, in the example illustrated in FIG. 1, prior to transmitting MSU 1B and placing its MTP point code in the MSU, STP D 106 may examine the OPC of MSU 1A (3-3-3) and the post-GTT DPC of MSU 1B (2-2-2). Since there is no match, STP D 106, according to one exemplary implementation, may also check a table that maps or correlates the OPC of the original message to one or more additional point codes and compares the post-GTT DPC to the additional point codes. For example, STP D 106 may correlate the OPC of MSU 1A to 2-2-2, the CPC of STP B 102. Since 2-2-2 matches the post-GTT DPC, STP D 106 may determine that looping is present.

Figure 2:
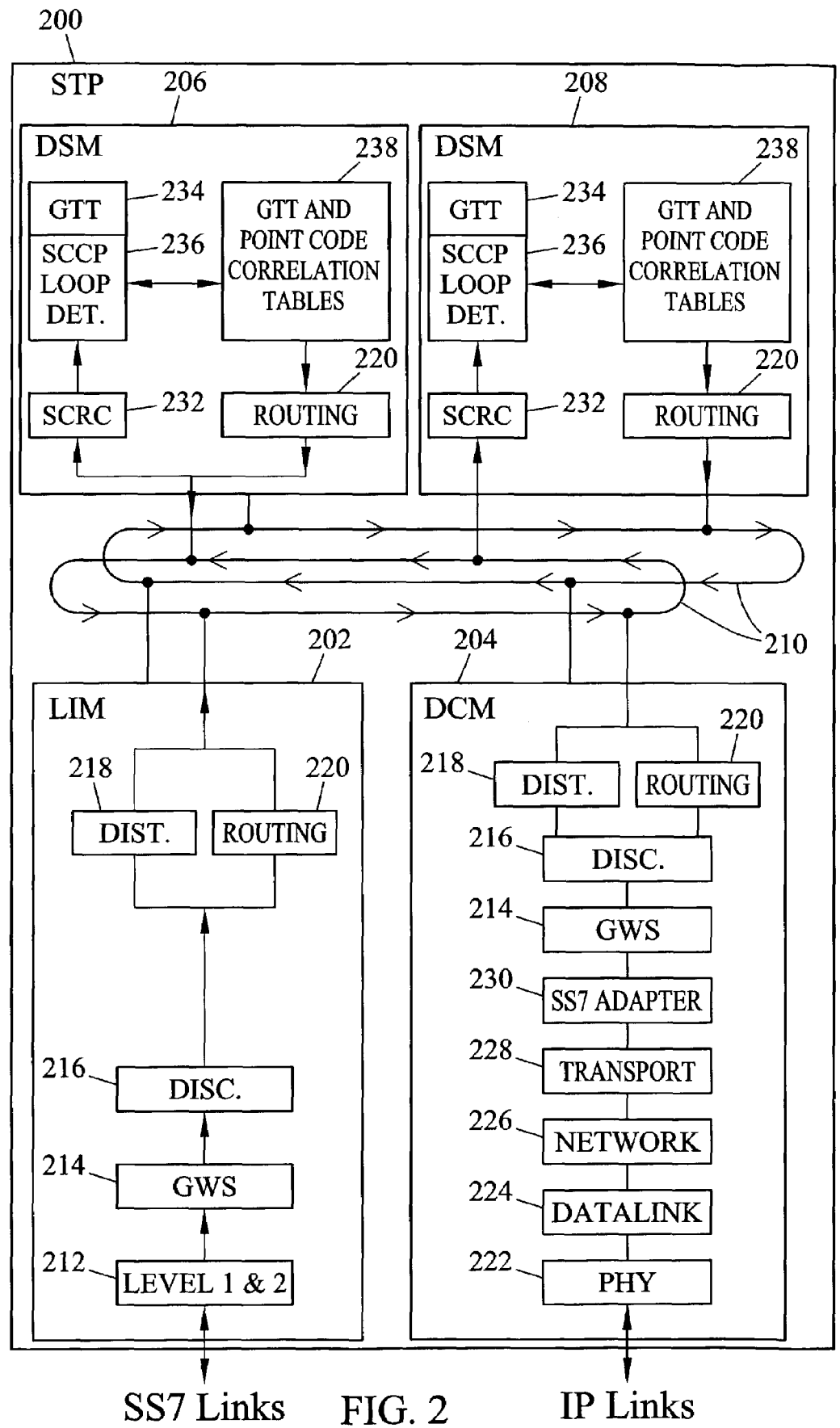
FIG. 2 is a block diagram illustrating exemplary internal architecture of a signal transfer point including an SCCP loop detector according to an embodiment of the present invention.

FIG. 2 is a block diagram of an STP including SCCP loop detection functionality according to an embodiment of the present invention. Referring to FIG. 2, STP 200 includes a plurality of internal processor cards 202, 204, 206, and 208 connected to each other via a pair of counter-rotating ring buses 210. In the illustrated example, the internal processor cards include a link interface module 202 for sending and receiving messages over SS7 signaling links, a data communications module 204 for sending and receiving SS7 and other types of signaling messages over IP signaling links, and database services modules 206 and 208 for performing global title translation and SCCP loop detection according to an embodiment of the present invention. It is understood that processing modules 202, 204, 206, and 208 may each include one or more microprocessors for executing the various telecommunications applications that will be described herein and associated memory.

Link interface module 202 includes an SS7 level 1 and 2 function 212 for performing error detection, error correction, and SS7 message sequencing. Gateway screening module 214 screens messages based on MTP information to determine whether to allow the messages into the network where STP 200 is located. Discrimination module 216 determines whether a received message should be routed or sent to an internal processing module for further processing. Distribution module 218 receives messages identified by discrimination module 216 as requiring further processing. Routing module 220 receives messages identified by discrimination module 216 as requiring routing and routes the message to the processor card associated with the appropriate outbound linkset.

Data communications module 204 may include a physical layer 222 for performing OSI physical layer functions and a data link layer 224 for performing OSI data link layer functions. Layers 222 and 224 may be implemented using an appropriately configured Ethernet card.

DCM 204 also includes a network layer 226 and a transport layer 228. Network layer 226 may implement Internet protocol (IP) communications. Transport layer 228 may implement OSI transport layer functions. Two examples of protocols suitable for use as transport layer 228 include the transmission control protocol (TCP) and the stream control transmission protocol (SCTP).

In order to send and receive SS7 messages over an underlying IP network, DCM 204 may include an SS7 adapter layer 230. SS7 adapter layer 230 preferably adapts SS7 message traffic for transport over an underlying non-SS7 network. Examples of protocols suitable for use as SS7 adapter layer 230 include TALI, M3UA, SUA, and M2PA, as described in the correspondingly named IETF Internet Drafts and RFCs. DCM 204 may also include gateway screening module 214, discrimination module 216, distribution module 218, and routing module 220. Modules 214-220 perform the same functions as those described above with regard to LIM 202.

DSMs 206 and 208 each include a signaling connection routing controller (SCRC) 232 for overall control of SCCP functionality. For example, SCRC 232 may call appropriate functions for performing global title translation and SCCP loop detection. In order to perform global title translation and SCCP loop detection, each DSM 206 may include a global title translation module 234 and an SCCP loop detector 236. Global title translation module 234 preferably performs global title translation on received signaling messages. SCCP loop detector 236 preferably determines whether SCCP looping is present based on correlation data stored in global title translation and point code correlation tables 238. Exemplary data that may be stored in tables 238 will be described in detail below.

Figure 3:
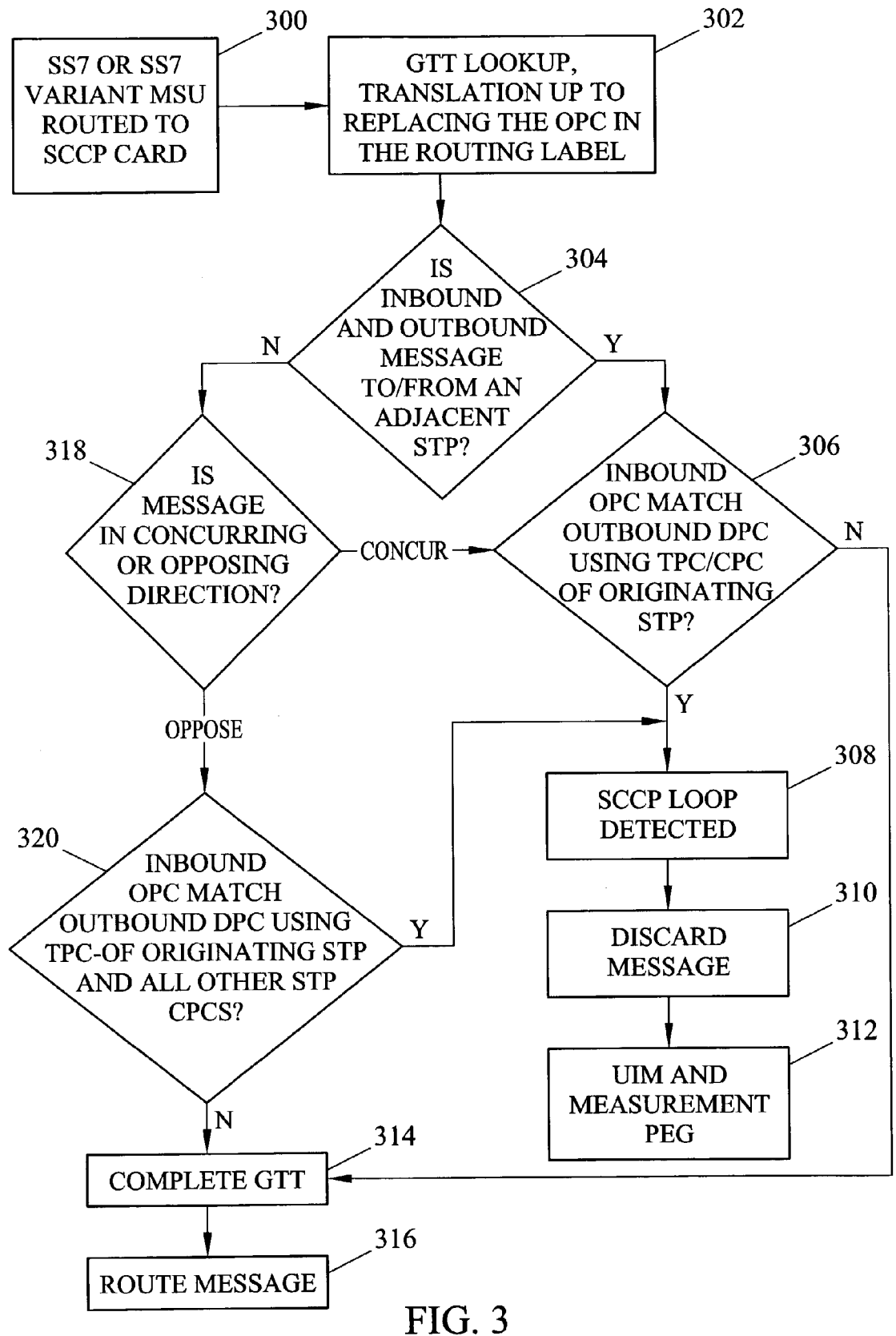
FIG. 3 is a flow chart illustrating exemplary steps that may be performed by an SCCP loop detector according to an embodiment of the present invention.

As discussed above, in some instances, network service providers may use capability point codes for load sharing purposes. FIG. 3 is a flow chart illustrating exemplary steps that may be performed by an STP in performing SCCP loop detection in a network in which capability point codes are used. Referring to FIG. 3, in step 300, STP 200 receives an SS7 message and routes the message to an SCCP card. Using the example illustrated in FIG. 3, an SCCP message may arrive at LIM 202. The message may pass SS7 level 1 and 2 and gateway screening. Discrimination function 216 determines that the message should be distributed to an internal subsystem because the message requires global title translation. Accordingly, discrimination function 216 passes the message to distribution function 218. Distribution function 218 distributes the message to DSM 206 for global title translation and SCCP loop detection processing.

In response to receiving the message, in step 302, DSM 206 performs global title translation of the message. However, DSM 206 preferably does not replace the OPC in the routing label of the message prior to performing the SCCP looping logic. In step 304, SCCP loop detector 236 determines whether the inbound message is from an adjacent STP and whether the outbound message is addressed to an adjacent STP. If the inbound message is from an adjacent STP and the outbound message is to adjacent STP, control proceeds to step 306 where SCCP loop detector 236 determines whether the inbound OPC matches the outbound DPC using TPC/SPC-CPC correlations of the originating STP that may be stored in GTT and point code correlation tables 238. More particularly, step 306 may first include comparing the OPC of the inbound message with the post-GTT DPC and match any of the point codes associated with the message originator. If there is a match, an SCCP loop is detected, as indicated by step 308. If there is not a match, the post-GTT DPC may be compared to any point codes that correlate with the OPC in the outbound message. If the inbound post-GTT DPC matches any of the correlated point codes, an SCCP loop is detected. Once an SCCP loop is detected, in step 310, the message is discarded. In step 312, a UIM message is sent to the originator and a count is made of the SCCP loop.

Returning to step 304, if the inbound message is not from an adjacent STP and/or the outbound message is not directed to an adjacent STP, control proceeds to step 314 where it is determined whether the outbound message is in the concurring or opposing direction. The concurring direction, as used herein, refers to the same direction that the message was traveling when it was received, as defined in a predetermined network topology map, such as that illustrated in FIG. 4 described below. An opposing direction, as used herein, refers to a direction opposite the direction from which a message was received. The opposing and concurring directions will be described in more detail below with reference to specific call flows.

If it is determined that the received message is in the concurring direction, control proceeds to step 306, where it is determined whether the post-GTT DPC matches any of the point codes associated with the message originator. Steps 308, 310, 312, and 314 are the same as those described above. In step 318, if it is determined that the outbound message is in the opposing direction, control proceeds to step 320 where it is determined whether the inbound OPC matches the outbound DPC using the true point code of the originating STP and all other capability point codes for which looping detection is desired. If the post-GTT DPC matches any of these point codes, control proceeds to steps 308-312 where an SCCP loop is detected, the message is discarded, and a UIM and a peg count are generated. In step 320, if the post-GTT DPC does not match any of the point codes to which the inbound OPC correlates, control proceeds to step 314 where GTT is completed. Then, control proceeds to step 316 where the message is routed to the destination specified by the DPC. Thus, using the steps illustrated in FIG. 3, even in a network in which nodes use capability point codes, SCCP looping can be detected.

The present invention is not limited to correlating the inbound OPC to additional point codes and comparing the post-GTT DPC to the correlated point codes in order to detect the presence of SCCP looping. In an alternate embodiment of the invention, the post-GTT DPC may be mapped to a true point code and compared to the point code of the originating node. Either method for detecting SCCP looping is intended to be within the scope of the invention.

Figure 4:
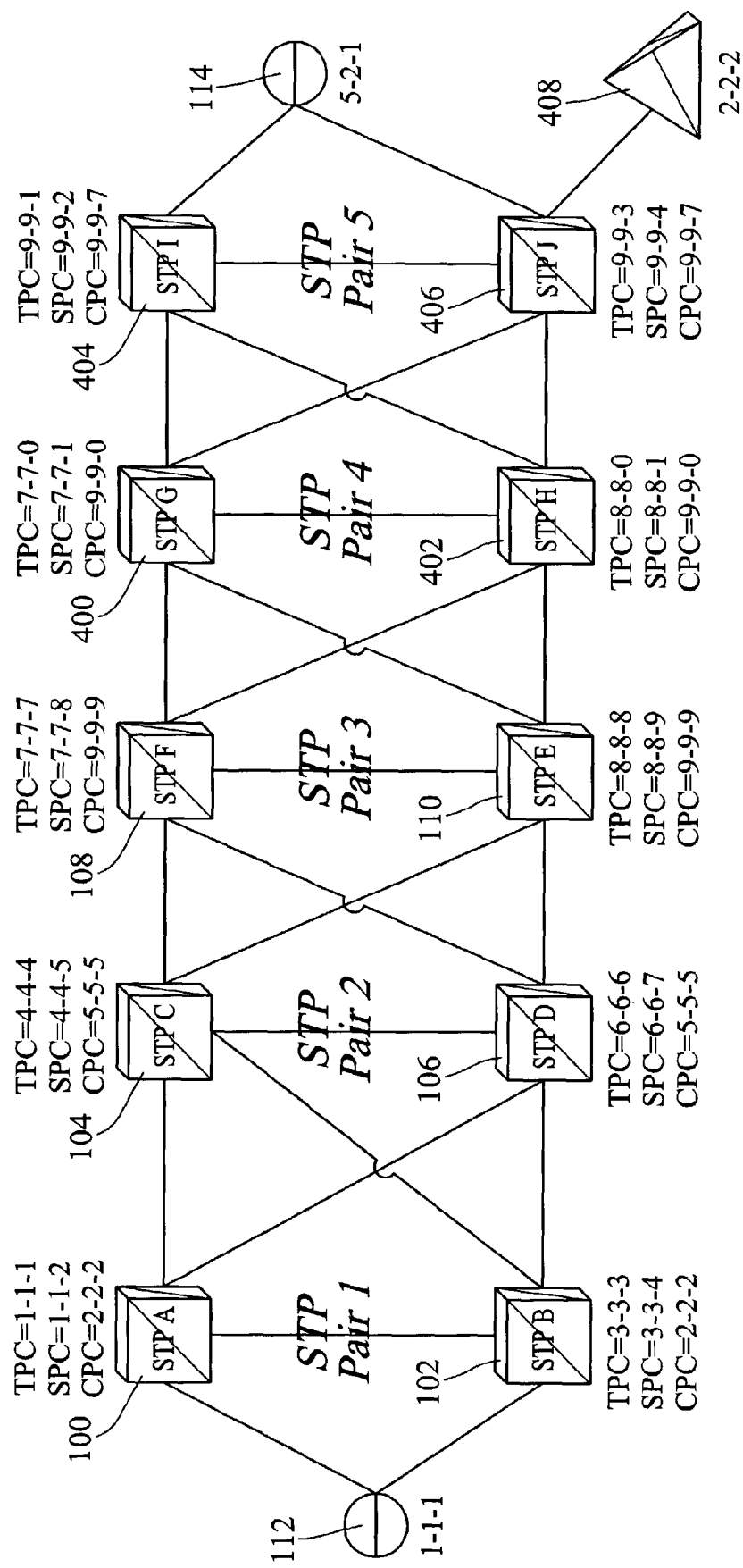
FIG. 4 is a network diagram illustrating an exemplary operating environment for an SCCP loop detector according to an embodiment of the present invention.

FIG. 4 illustrates an example of a network in which routing nodes, such as STPs, utilize true point codes and capability point codes to identify each other. In the illustrated example, each STP includes a true point code, a secondary true point code, and a capability point code. The network diagram illustrated in FIG. 4 includes network elements 100-110 described above with respect to FIG. 1. In addition, the network diagram illustrated in FIG. 4 includes STPs 400, 402, 404, and 406, and an SCP 408.

As described above with regard to FIG. 3, SCCP loop detection depends on the direction of the incoming message and whether the message is sent from an adjacent node or a non-adjacent node. In networks in which nodes use capability point codes and STP according to an embodiment of the present invention may utilize the following rules:

1. For messages in the concurring direction, the receiving STP may check the incoming message OPC with the outbound post-GTT DPC using a check with the inbound STP's TPC and CPC only.
2. For messages in the opposing direction, the receiving STP may check the incoming message OPC with the outbound message GTT DPC by comparing the outbound message DPC to the inbound STP's PC and all other STPs' CPCs that correlate with the OPC.

3. For messages received from non-adjacent STPs, the post-GTT DPC is preferably compared to the TPC, SPC, and CPC of the sending node and all other STP CPCs that correlate with the OPC.

4. The mate STP's point codes are preferably not considered.

As stated above, the concurring direction refers to the same direction in which a message was previously traveling. A more formal definition is as follows:

Concurring direction—A direction when the message flow from an STP ID view as shown in FIG. 4 is either decrementing or incrementing, but not both.

For example, using the network diagram in FIG. 4, a message flowing from an STP B 102 to STP D 106 to STP H 402 would be considered the concurring directions with regard to STP D 106, because the message travels in a direction of increasing-only STP pair IDs (1→2→3). In another example, a message from STP B 102 to STP H 402 to STP J 406 would be considered as flowing in the concurring direction by STP H 402 because the message flows from STP pair 1 to 4 to 5. In yet another example, a message from STP H 402 to STP D 106 to STP B 102 would be considered as flowing in the concurring direction by STP D 106 because the message flows in a direction of decreasing-only STP pair IDs (4→2→1). In yet another example, a message from STP J 406 to STP H 402 to STP E 110 would be considered as flowing in the concurring direction by STP H 402 because the message flows only in the direction of decreasing STP IDs (5→4→3).

As stated above, the opposing direction refers to the opposite direction from which a message is received. A more formal definition of "opposing direction" may be "traveling in a direction of both incrementing and decrementing STP IDs." Using the network diagram illustrated in FIG. 4, a message from STP E 110 to STP H 402 to STP D 106 would be considered as flowing in the opposing direction by STP D 106 because the message flows from STP pair 3 to pair 4 to pair 2. In another example, a message from STP D 106 to STP H 402 to STP D 102 would be considered as flowing in the opposing direction because the message flows from pair 2 to 4 to 2. In yet another example, a message from STP J 406 to STP E 110 and to STP H 402 would be considered as flowing in the opposing direction because the message flows from pair 5 to 3 to 4.

Table 1 shown below illustrates exemplary SCCP logic that may be implemented by an STP loop detector according to an embodiment of the present invention to prevent SCCP looping while allowing valid messages to be translated in routing. This logic in Table 1 shown below is implemented in the flow chart illustrated in FIG. 3.

TABLE 1

Logic Table for SCCP Looping for Networks that Use CPCs

| Message Direction | Inbound Message | Outbound Message | Incoming OPC-Outbound DPC correlation |
|---|---|---|---|
| Concurring | Adjacent STP | Adjacent STP | Correlates CPC to PC of originating STP |
| Opposing | Adjacent STP | Adjacent STP | Correlates CPC to PC of originating STP |
| Concurring | Adjacent STP | Non-adjacent STP | Correlates CPC to PC of originating STP |
| Opposing | Adjacent STP | Non-adjacent STP | Correlates all other CPCs to PC of originating STP |

TABLE 1-continued

Logic Table for SCCP Looping for Networks that Use CPCs

| Message Direction | Inbound Message | Outbound Message | Incoming OPC-Outbound DPC correlation |
|---|---|---|---|
| Concurring | Non-adjacent STP | Adjacent STP | Correlates CPC to PC of originating STP |
| Opposing | Non-adjacent STP | Adjacent STP | Correlates all other CPCs to PC of originating STP |
| Concurring | Non-adjacent STP | Non-adjacent STP | Correlates CPC to PC of originating STP |
| Opposing | Non-adjacent STP | Non-adjacent STP | Correlates all other CPCs to PC of originating STP |

Tables 2-6 shown below illustrate exemplary SPC/TPC=CPC mappings that may be used by STPs 100-110 and 400-406 illustrated in FIG. 3 in performing SCCP loop detection according to an embodiment of the present invention. Each Table correlates TPCs and SCPs with CPCs for use in detecting looping when the post-GTT DPC and OPC of a message do not match. The use of the tables in detecting SCCP looping will be described with reference to specific message flows below.

TABLE 2

TPC/SPC→CPC Mappings for STP B

| STP GROUP | STP ID | TPC/SPC | CPC | Other CPCs |
|---|---|---|---|---|
| STP PAIR 2 | STP D | 6-6-6<br>6-6-7 | 5-5-5 | 2-2-2<br>9-9-9<br>9-9-0<br>9-9-7 |
| STP PAIR 2 | STP C | 4-4-4<br>4-4-5 | 5-5-5 | 2-2-2<br>9-9-9<br>9-9-0<br>9-9-7 |
| STP PAIR 3 | STP F | 8-8-8<br>8-8-9 | 9-9-9 | 2-2-2<br>5-5-5<br>9-9-0<br>9-9-7 |
| STP PAIR 3 | STP E | 7-7-7<br>7-7-8 | 9-9-9 | 2-2-2<br>5-5-5<br>9-9-0<br>9-9-7 |
| STP PAIR 4 | STP G | 7-7-0<br>7-7-1 | 9-9-0 | 2-2-2<br>5-5-5<br>9-9-9<br>9-9-7 |
| STP PAIR 4 | STP H | 8-8-0<br>8-8-1 | 9-9-0 | 2-2-2<br>5-5-5<br>9-9-9<br>9-9-7 |
| STP PAIR 5 | STP I | 9-9-1<br>9-9-2 | 9-9-7 | 2-2-2<br>5-5-5<br>9-9-9<br>9-9-0 |
| STP PAIR 5 | STP J | 9-9-3<br>9-9-4 | 9-9-7 | 2-2-2<br>5-5-5<br>9-9-9<br>9-9-0 |

TABLE 3

TPC/SPC→CPC Mappings for STP D

| STP GROUP | STP ID | TPC/SPC | CPC | Other CPCs |
|---|---|---|---|---|
| STP PAIR 1 | STP A | 1-1-1<br>1-1-2 | 2-2-2 | 5-5-5<br>9-9-9<br>9-9-0<br>9-9-7 |

TABLE 3-continued

TPC/SPC→CPC Mappings for STP D

| STP GROUP | STP ID | TPC/SPC | CPC | Other CPCs |
|---|---|---|---|---|
| STP PAIR 1 | STP B | 3-3-3<br>3-3-4 | 2-2-2 | 5-5-5<br>9-9-9<br>9-9-0<br>9-9-7 |
| STP PAIR 3 | STP F | 8-8-8<br>8-8-9 | 9-9-9 | 2-2-2<br>5-5-5<br>9-9-0<br>9-9-7 |
| STP PAIR 3 | STP E | 7-7-7<br>7-7-8 | 9-9-9 | 2-2-2<br>5-5-5<br>9-9-0<br>9-9-7 |
| STP PAIR 4 | STP G | 7-7-0<br>7-7-1 | 9-9-0 | 2-2-2<br>5-5-5<br>9-9-9<br>9-9-7 |
| STP PAIR 4 | STP H | 8-8-0<br>8-8-1 | 9-9-0 | 2-2-2<br>5-5-5<br>9-9-9<br>9-9-7 |
| STP PAIR 5 | STP I | 9-9-1<br>9-9-2 | 9-9-7 | 2-2-2<br>5-5-5<br>9-9-9<br>9-9-0 |
| STP PAIR 5 | STP J | 9-9-3<br>9-9-4 | 9-9-7 | 2-2-2<br>5-5-5<br>9-9-9<br>9-9-0 |

TABLE 4

TPC/SPC→CPC Mappings for STP E

| STP GROUP | STP ID | TPC/SPC | CPC | Other CPCs |
|---|---|---|---|---|
| STP PAIR 1 | STP A | 1-1-1<br>1-1-2 | 2-2-2 | 5-5-5<br>9-9-9<br>9-9-0<br>9-9-7 |
| STP PAIR 1 | STP B | 3-3-3<br>3-3-4 | 2-2-2 | 5-5-5<br>9-9-9<br>9-9-0<br>9-9-7 |
| STP PAIR 2 | STP D | 6-6-6<br>6-6-7 | 5-5-5 | 2-2-2<br>9-9-9<br>9-9-0<br>9-9-7 |
| STP PAIR 2 | STP C | 4-4-4<br>4-4-5 | 5-5-5 | 2-2-2<br>9-9-9<br>9-9-0<br>9-9-7 |
| STP PAIR 4 | STP G | 7-7-0<br>7-7-1 | 9-9-0 | 2-2-2<br>5-5-5<br>9-9-9<br>9-9-7 |
| STP PAIR 4 | STP H | 8-8-0<br>8-8-1 | 9-9-0 | 2-2-2<br>5-5-5<br>9-9-9<br>9-9-7 |
| STP PAIR 5 | STP I | 9-9-1<br>9-9-2 | 9-9-7 | 2-2-2<br>5-5-5<br>9-9-9<br>9-9-0 |
| STP PAIR 5 | STP J | 9-9-3<br>9-9-4 | 9-9-7 | 2-2-2<br>5-5-5<br>9-9-9<br>9-9-0 |

TABLE 5

TPC/SPC→CPC Mappings for STP H

| STP GROUP | STP ID | TPC/SPC | CPC | Other CPCs |
|---|---|---|---|---|
| STP PAIR 1 | STP A | 1-1-1<br>1-1-2 | 2-2-2 | 5-5-5<br>9-9-9<br>9-9-0<br>9-9-7 |
| STP PAIR 1 | STP B | 3-3-3<br>3-3-4 | 2-2-2 | 5-5-5<br>9-9-9<br>9-9-0<br>9-9-7 |
| STP PAIR 2 | STP D | 6-6-6<br>6-6-7 | 5-5-5 | 2-2-2<br>9-9-9<br>9-9-0<br>9-9-7 |
| STP PAIR 2 | STP C | 4-4-4<br>4-4-5 | 5-5-5 | 2-2-2<br>9-9-9<br>9-9-0<br>9-9-7 |
| STP PAIR 3 | STP F | 8-8-8<br>8-8-9 | 9-9-9 | 2-2-2<br>5-5-5<br>9-9-0<br>9-9-7 |
| STP PAIR 3 | STP E | 7-7-7<br>7-7-8 | 9-9-9 | 2-2-2<br>5-5-5<br>9-9-0<br>9-9-7 |
| STP PAIR 5 | STP I | 9-9-1<br>9-9-2 | 9-9-7 | 2-2-2<br>5-5-5<br>9-9-9<br>9-9-0 |
| STP PAIR 5 | STP J | 9-9-3<br>9-9-4 | 9-9-7 | 2-2-2<br>5-5-5<br>9-9-9<br>9-9-0 |

TABLE 6

TPC/SPC→CPC Mappings for STP J

| STP GROUP | STP ID | TPC/SPC | CPC | Other CPCs |
|---|---|---|---|---|
| STP PAIR 1 | STP A | 1-1-1<br>1-1-2 | 2-2-2 | 5-5-5<br>9-9-9<br>9-9-0<br>9-9-7 |
| STP PAIR 1 | STP B | 3-3-3<br>3-3-4 | 2-2-2 | 5-5-5<br>9-9-9<br>9-9-0<br>9-9-7 |
| STP PAIR 2 | STP D | 6-6-6<br>6-6-7 | 5-5-5 | 2-2-2<br>9-9-9<br>9-9-0<br>9-9-7 |
| STP PAIR 2 | STP C | 4-4-4<br>4-4-5 | 5-5-5 | 2-2-2<br>9-9-9<br>9-9-0<br>9-9-7 |
| STP PAIR 3 | STP F | 8-8-8<br>8-8-9 | 9-9-9 | 2-2-2<br>5-5-5<br>9-9-0<br>9-9-7 |
| STP PAIR 3 | STP E | 7-7-7<br>7-7-8 | 9-9-9 | 2-2-2<br>5-5-5<br>9-9-0<br>9-9-7 |
| STP PAIR 4 | STP G | 7-7-0<br>7-7-1 | 9-9-0 | 2-2-2<br>5-5-5<br>9-9-9<br>9-9-7 |
| STP PAIR 4 | STP H | 8-8-0<br>8-8-1 | 9-9-0 | 2-2-2<br>5-5-5<br>9-9-9<br>9-9-7 |

STP Database Provisioning

In order to implement the scheme illustrated in Table 1 and FIG. 3 described above, an STP performing the loop detection function is preferably provisioned with information regarding other STPs. For example, the information may include whether an STP is adjacent or non-adjacent and also include a pair identifier that identifies the pair number of the STP in the network for determining whether a message is traveling in the concurring or opposing direction. For example, for STP H 402 illustrated in FIG. 4, the STP pairs may be numbered 1-5 in the network, with 4 being identified by STP H 402 as its own pair identifier. For each STP pair number, data that may be stored includes the STP ID of each STP in the pair (e.g. STP A and STP B for pair #1), and the point codes associated with each STP ID. Once the pair IDs and STP data are entered, SCCP loop detectors 236 associated with each STP may determine which STPs are adjacent using the STP pair IDs. For example, STP H 402 would determine that STP E 110, STP F 108, STP I 404, and STP J 406 are adjacent using the pair IDs.

Figure 5:
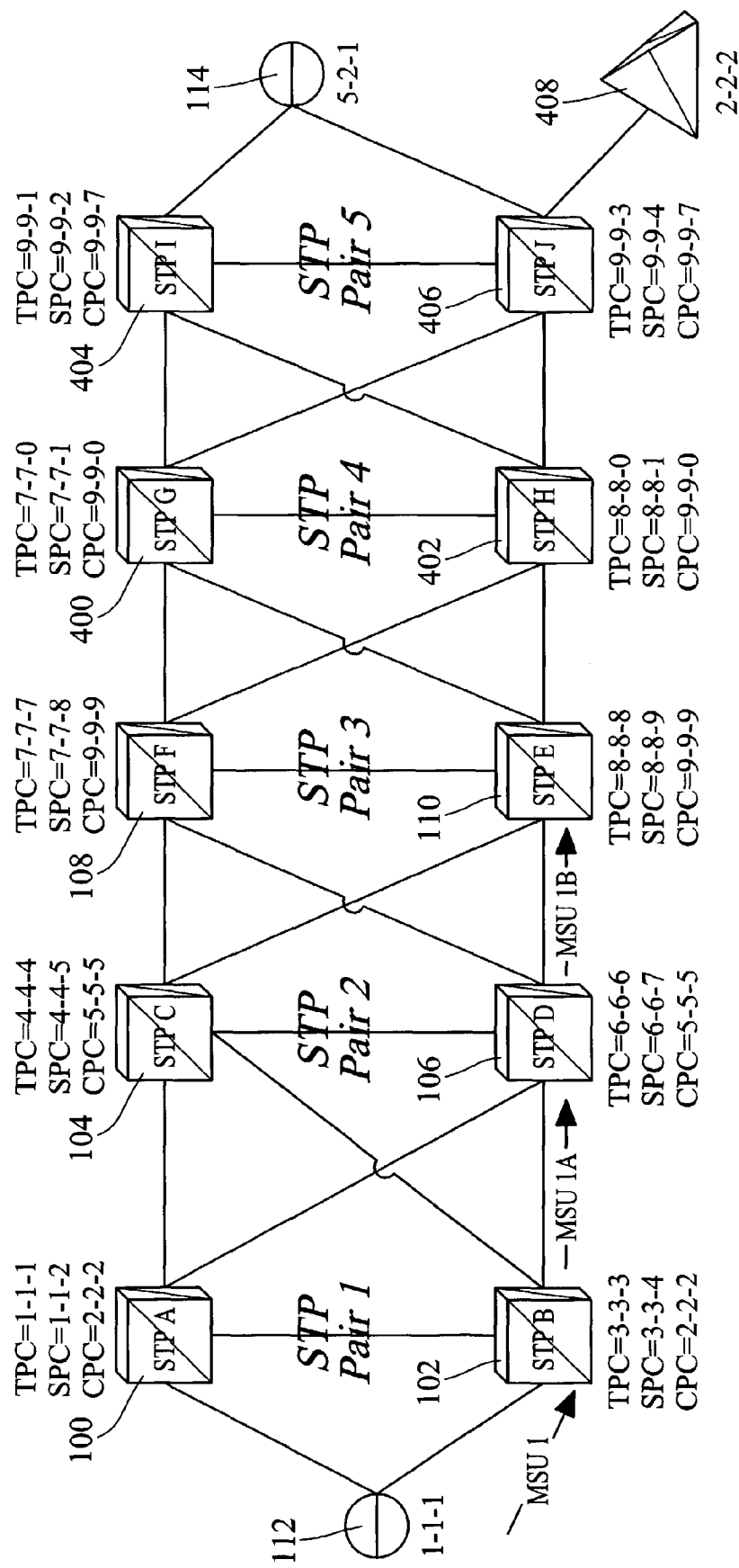
FIG. 5 is a network diagram corresponding to the network in FIG. 4 illustrating a message flow for an inbound message from an adjacent STP destined for an adjacent STP in the concurring direction according to an embodiment of the present invention.

In order to illustrate the logic illustrated in FIG. 3 and Table 1, several examples of SCCP loop detection will now be explained in detail. FIG. 5 is a message flow diagram illustrating an exemplary message flow for an inbound message received from an adjacent STP and resulting in an outbound message to an adjacent STP in the concurring direction. In the example illustrated in FIG. 5, STP D 106 is assumed to be the receiving STP. A message MSU 1 is assumed to originate from SSP 112. The message is sent to STP B 102 as route on global title. STP B 102 receives the message, performs an intermediate global title translation on the message, and produces MSU 1A. MSU 1A is assumed to have the following fields:

MTP OPC=3-3-3

MTP DPC=5-5-5

CGPA OPC=244-2-1

CDPA DPC=5-5-5.

When STP D 106 receives the message, STP D performs a global title translation to produce a message with the following fields:

MTP OPC=6-6-6

MTP DPC=9-9-9

CGPA OPC=1-1-1

CDPA DPC=9-9-9.

STP D 106 then performs SCCP loop detection for the message. In performing loop detection, STP D 106 compares the OPC in MSU 1A (3-3-3) and post-GTT DPC in MSU 1B (9-9-9) and determines that the point codes do not match. In the next level of SCCP loop detection, the SCCP loop detector in STP D 106 determines that message 1A is from an adjacent STP, message 1B is flowing in a concurring direction, and the destination STP, STP E 110 is an adjacent STP. Accordingly, from Tables 1 and 3, STP D 106 correlates the true point code of the originating STP (3-3-3) and its capability point code (2-2-2). Since 2-2-2 does not match the post-GTT DPC (9-9-9), the message passes loop detection.

Figure 6:
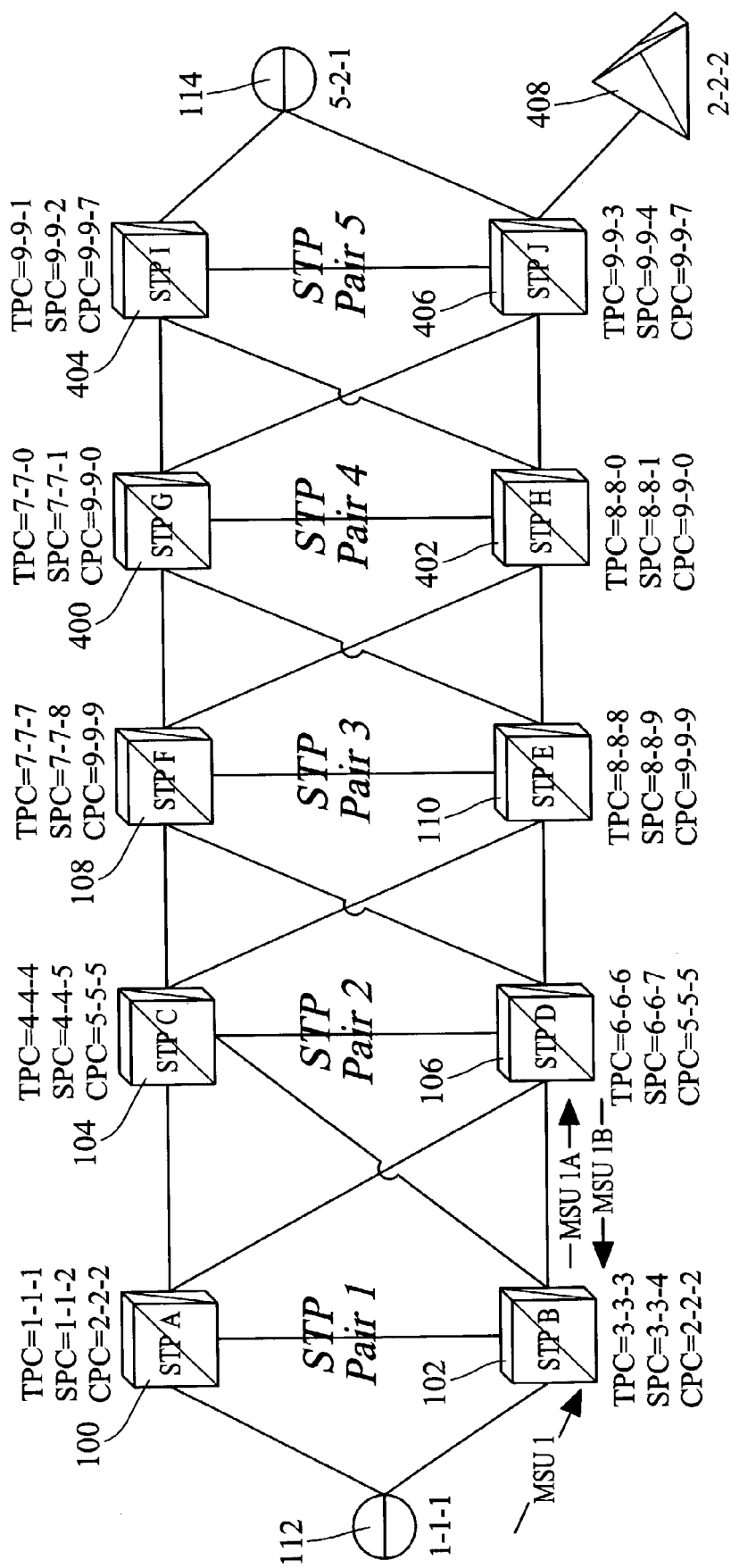
FIG. 6 is a network diagram corresponding to the network in FIG. 4 illustrating a message flow for an inbound message from an adjacent STP to an adjacent STP in the opposing direction according to an embodiment of the present invention.

FIG. 6 is a network diagram illustrating an exemplary message flow for a message from adjacent STP to an adjacent STP in the opposing direction. In FIG. 6, MSU 1 originates from SSP 112. MSU 1 has the same fields as described above for the example in FIG. 5. STP B 102 global title translates MSU 1 to form MSU 1A. The OPC in MSU 1A is 3-3-3. The remaining fields are the same as those described above with respect to FIG. 5. Upon receiving MSU 1A, STP D 106 performs global title translation to produce MSU 1B with a post-GTT DPC of 2-2-2. STP D 106 determines that the message is from an adjacent node, directed to an adjacent node, and the message flow is in the opposing direction. Accordingly, from Tables 1 and 3, STP D 106 correlates the CPC in the incoming message to the point code of the originating STP. In this case, the OPC in MSU 1A is 3-3-3. The OPC correlates to a CPC of 2-2-2, and 2-2-2 matches the post-GTT DPC. As a result, MSU 1B fails the looping check. MSU 1B is preferably discarded by STP D 106, rather than being routed to STP B 102.

Figure 7:
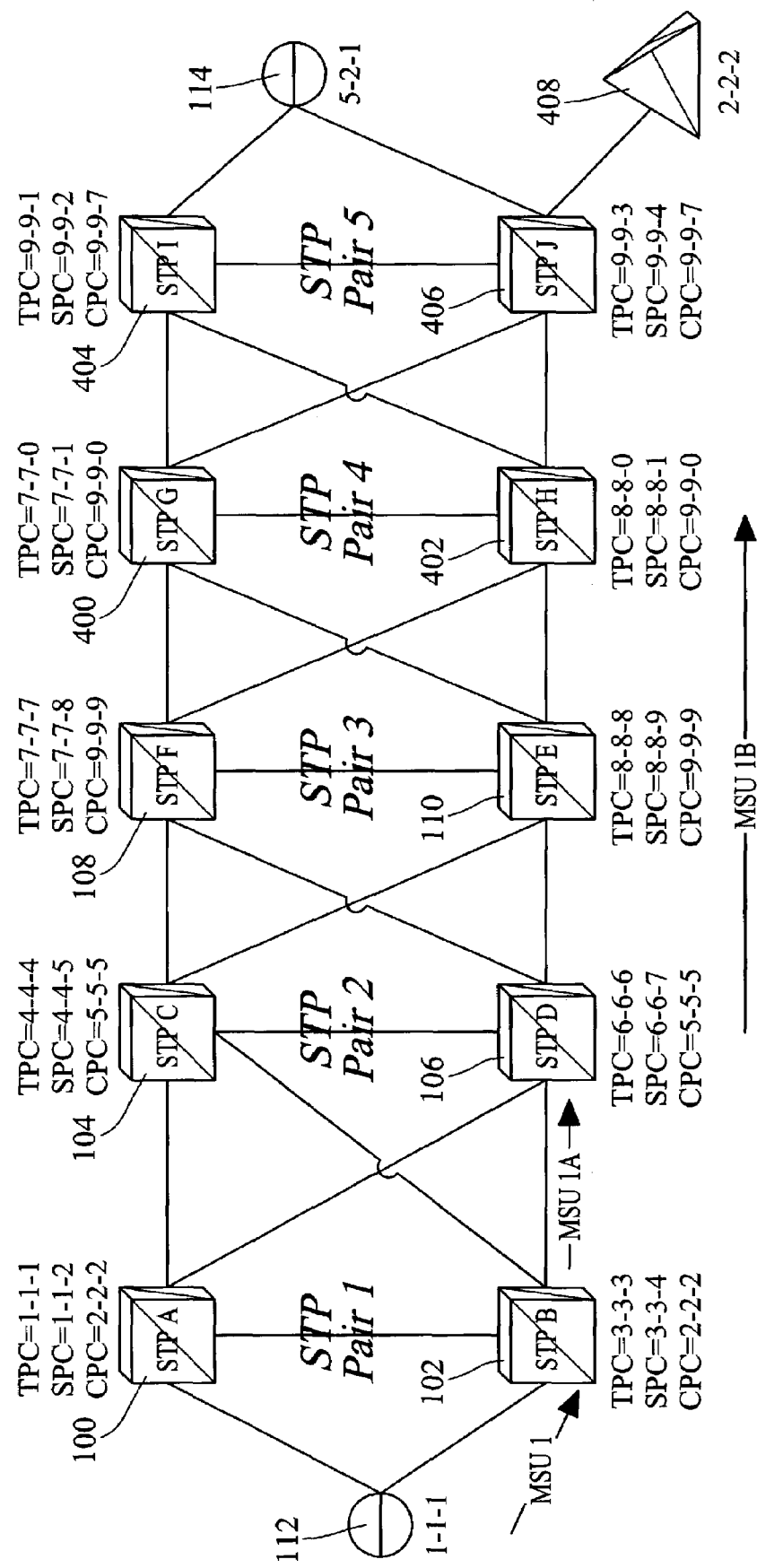
FIG. 7 is a network diagram corresponding to the network in FIG. 4 illustrating an exemplary message flow for an inbound message from an adjacent STP destined for a non-adjacent STP in the concurring direction according to an embodiment of the present invention.

FIG. 7 illustrates yet another example of SCCP loop detection according to an embodiment of the present invention. In FIG. 7, a message flow is illustrated where an inbound message is from an adjacent STP and the outbound message is to a non-adjacent STP in the concurring direction. Referring to FIG. 7, MSU 1 originates from SSP 112 and is global title translated by STP B 106 into MSU 1A. MSU 1A arrives at STP D 106. STP D 106 performs global title translation on the message to result in a post-GTT DPC of 9-9-0, which is a capability point code of STP H 302. Accordingly, STP D 106 determines that the message is from an adjacent STP and destined for a non-adjacent STP and the concurring direction. From Table 1, in this situation, STP D 106 maps the OPC to the CPC of the originating node. From Table 3, the OPC in the incoming message correlates to a CPC of 2-2-2. The post-GTT DPC, however, is 9-9-0, which does not match 2-2-2. Accordingly, MSU 1B passes the looping check and is routed to STP H 402.

Figure 8:
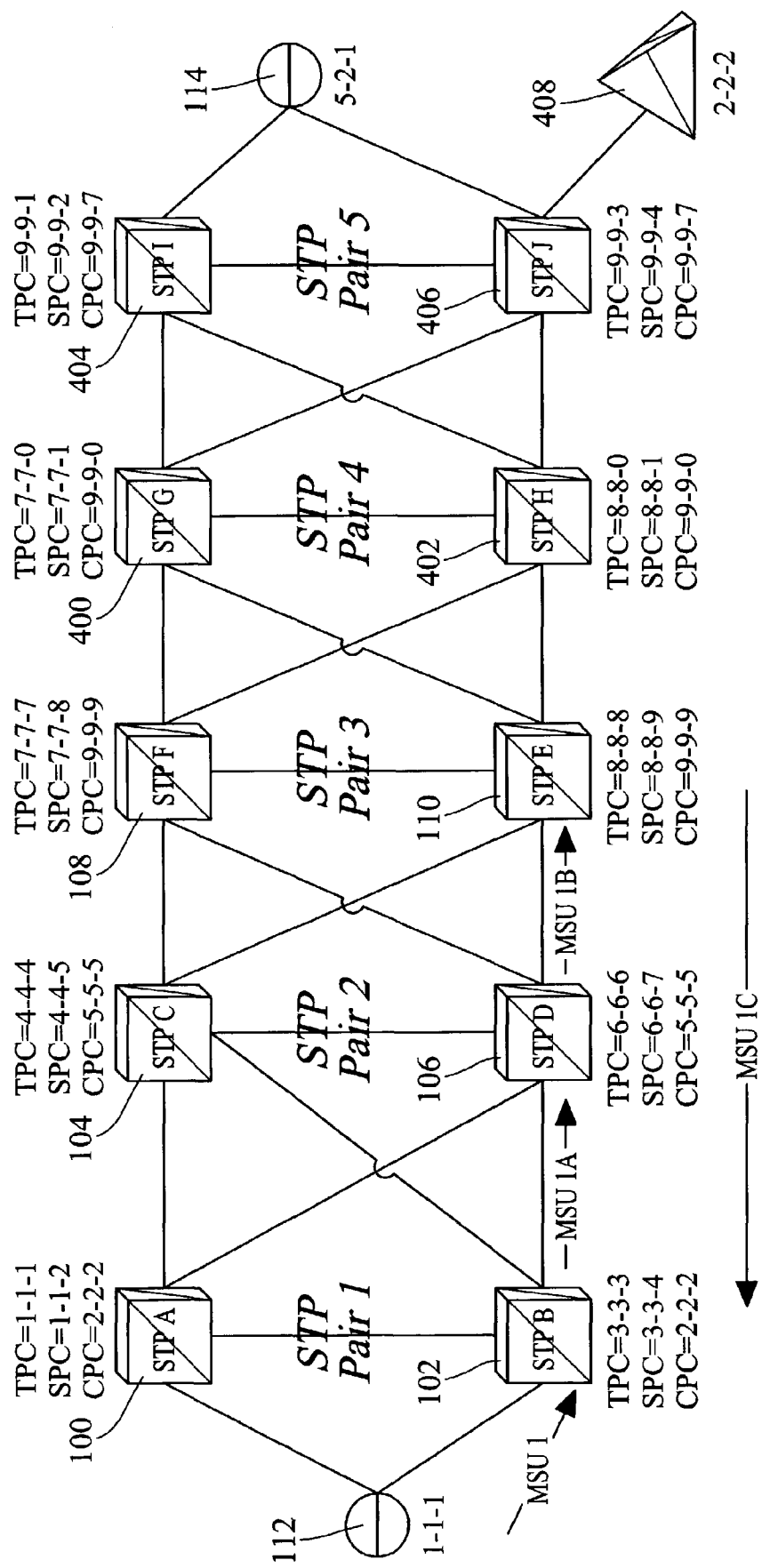
FIG. 8 is a network diagram corresponding to the network in FIG. 4 illustrating an exemplary message flow for an inbound message from an adjacent STP destined for a non-adjacent STP in the opposing direction according to an embodiment of the present invention.

FIG. 8 is a message flow diagram illustrating loop detection for the inbound messages from an adjacent STP and the outbound messages to a non-adjacent STP in the opposing direction. Referring to FIG. 8, SSP 112 originates MSU 1 and forwards MSU 1 to STP B 102. STP B 102 global title translates MSU 1 into MSU 1A and forwards MSU 1A to STP D 106. STP D 106 performs global title translation on MSU 1A to produce MSU 1B. The OPC in MSU 1B is 6-6-6, and the DPC is 9-9-9, which corresponds to STP E. Accordingly, STP D 106 routes MSU 1B to STP E 110. STP E 110 receives MSU 1B and global title translates MSU 1B to produce MSU 1C. MSU 1C is assumed to have the following fields after global title translation:

MTP OPC=8-8-8

MTP DPC=2-2-2

CGPA OPC=1-1-1

CDPA DPC=2-2-2.

STP E 110 determines that the message is from an adjacent STP (STP D 106) and destined for a non-adjacent STP (STP B 102) in the opposing direction. Accordingly, from Table 1, STP E 110 preferably correlates all other CPCs to the PC of the originating STP. The OPC in the message received by STP E 110 is 6-6-6. From Table 4, 6-6-6 correlates to 5-5-5, 2-2-2, 9-9-9, 9-9-0 and 9-9-7. Since 2-2-2 matches the post-GTT DPC, MSU 1C fails the looping check.

Figure 9:
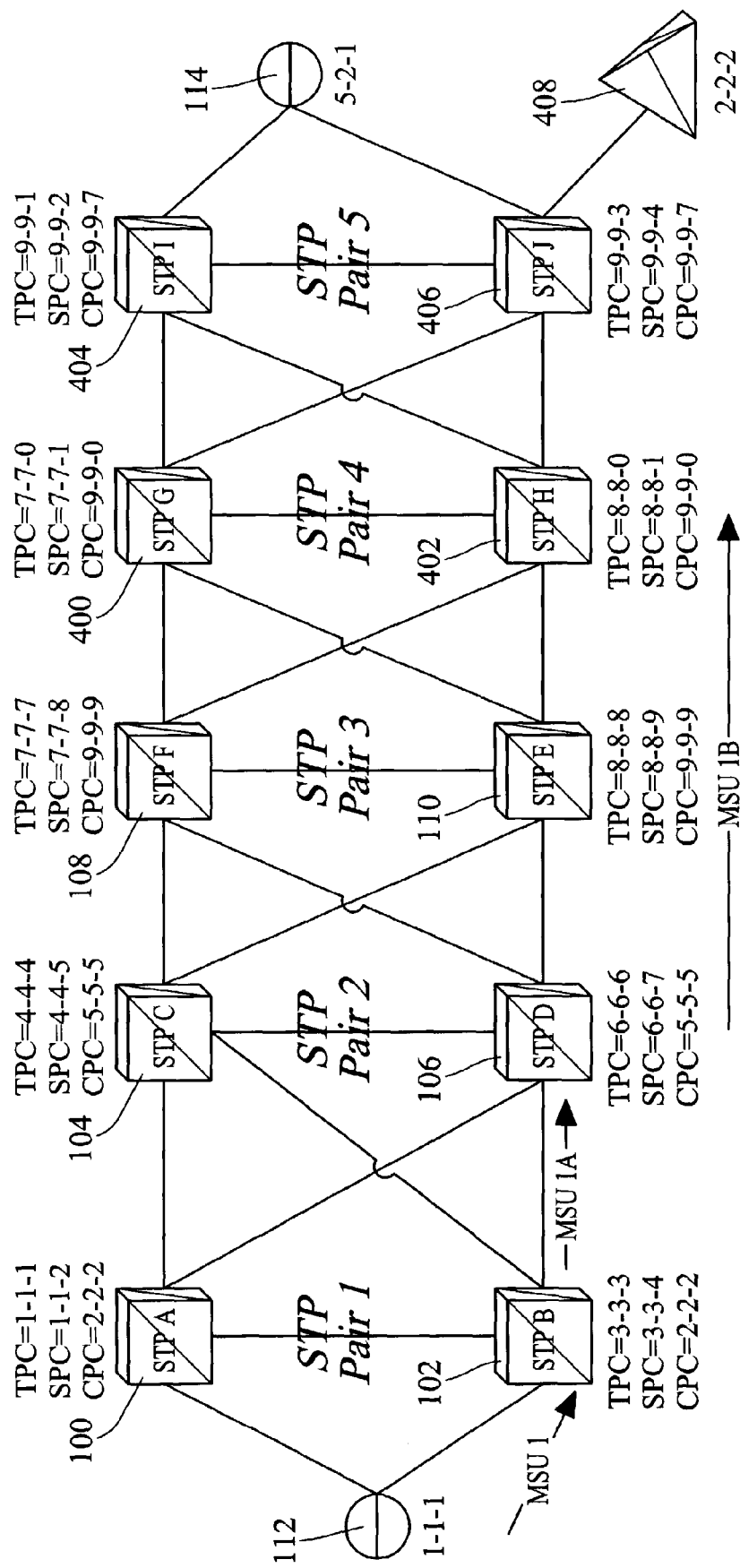
FIG. 9 is a network diagram corresponding to the network in FIG. 4 illustrating an exemplary message flow for an inbound message from an adjacent STP destined for a non-adjacent STP in the concurring direction according to an embodiment of the present invention.

FIG. 9 is a message flow diagram illustrating exemplary loop detection for a message received from a non-adjacent STP and destined for a non-adjacent STP in the concurring direction. In FIG. 9, SSP 112 originates MSU 1 and routes the message to STP B 102. STP B 102 global title translates the message to produce MSU 1A and routes MSU 1A to STP D 106. STP D 106 global title translates MSU 1A to produce MSU 1B. MSU 1B has a destination point code of 9-9-0, which corresponds to STP H. Accordingly, STP D 106 routes the message to STP H 402. Upon receiving the message, STP H 402 performs global title translation to produce MSU 1C. MSU 1C is assumed to have the following fields:

MTP OPC=8-8-0

MTP DPC=9-9-7

CGPA OPC=1-1-1

CDPA DPC=9-9-7.

STP H 402 determines that the message is from a non-adjacent STP, destined to an adjacent STP in the concurring direction. Accordingly, from Table 1, STP H 402 correlates the CPC to the PC of originating STP. In this example, the point code of the originating STP is 6-6-6. Using Table 5 above, 6-6-6 correlates to a CPC of 5-5-5. Since 5-5-5 does not match the MTP DPC in the message, the message passes the SCCP looping check. It should be noted that 9-9-7 is in the other CPC column for TPC/STP equals 6-6-6. However, this column is not checked in this case. Thus, by selectively correlating the OPC to predetermined sets of CPCs, an SCCP loop detector according to the present invention prevents SCCP looping while allowing valid messages to pass.

Figure 10:
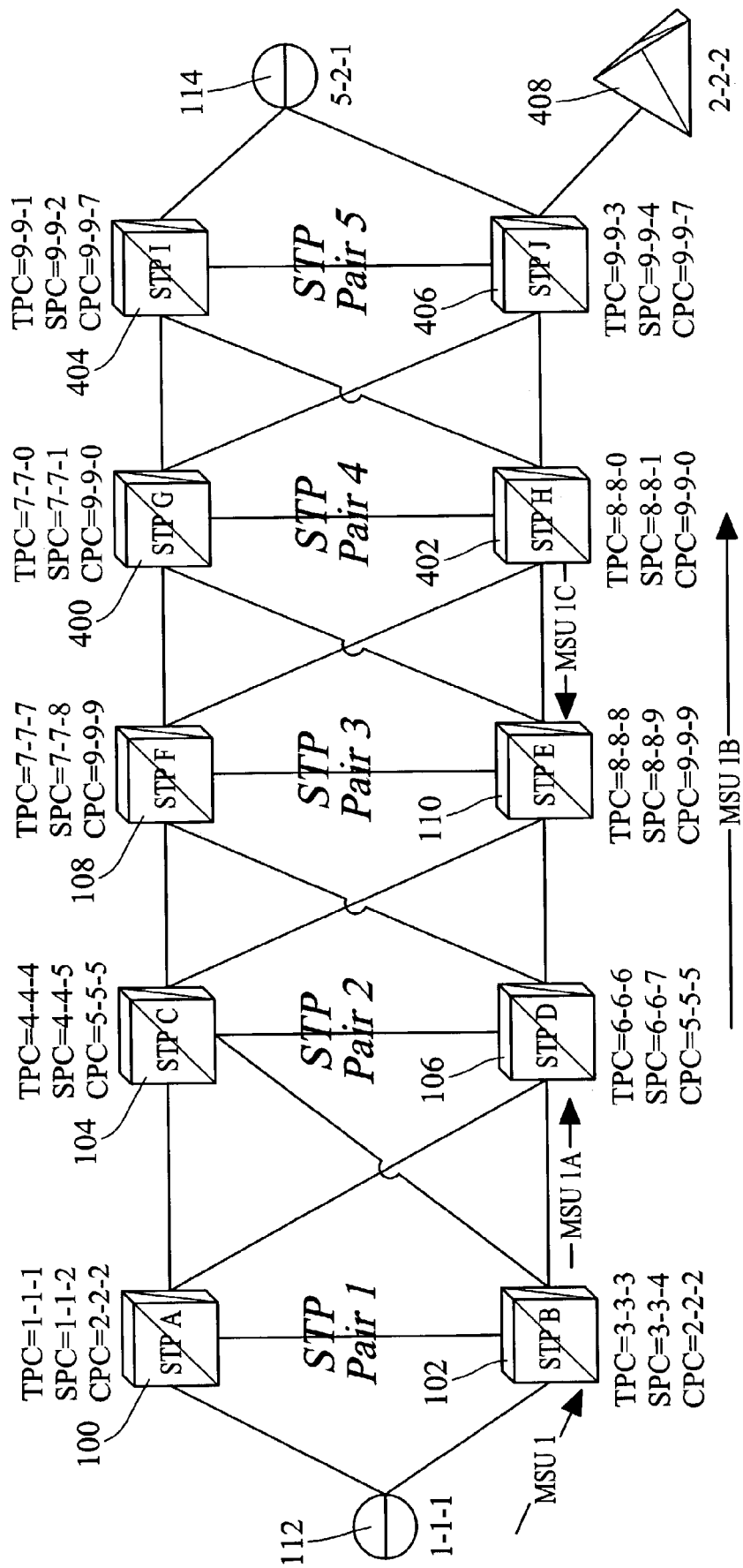
FIG. 10 is a network diagram corresponding to the network in FIG. 4 illustrating an exemplary message flow for an inbound message from a non-adjacent STP destined for an adjacent STP in the opposing direction according to an embodiment of the present invention.

FIG. 10 is a message flow diagram illustrating exemplary SCCP loop detection for a message originating from a non-adjacent STP to a non-adjacent STP in the opposing direction. Referring to FIG. 10, SSP 112 originates MSU 1 and forwards MSU 1 to STP B 102. STP B 102 global title translates MSU 1 to produce MSU 1A. The post-GTT DPC and MSU 1A corresponds to STP D 106. Accordingly, STP B 102 routes MSU 1A to STP D 106.

STP D 106 receives MSU 1A and global title translates MSU 1a to produce MSU 1B. MSU 1B is assumed to have a post-GTT DPC of 9-9-0. Accordingly, 9-9-0 corresponds to STP H 402. Accordingly, STP D 106 routes MSU 1B to STP H 402.

STP H 402 global title translates MSU 1b to produce MSU 1C. In this example, MSU 1C is assumed to have the following fields:

MTP OPC=8-8-0

MTP DPC=9-9-9

CGPA OPC=1-1-1

CDPA DPC=9-9-9.

STP H 402 determines that the message is from a non-adjacent STP and destined for an adjacent STP in the opposing direction. Accordingly, using Table 1, STP H 402 correlates the OPC of the originating node (STP D) and all other CPCs. The OPC of the originating node is 6-6-6. Using Table 5, 6-6-6 correlates to 5-5-5, 2-2-2, 9-9-9, 9-9-0, and 9-9-7. Since 9-9-9 matches the MTP DPC, MSU 1C fails the looping check. Accordingly, STP H 402 preferably discards MSU 1C.

Figure 11:
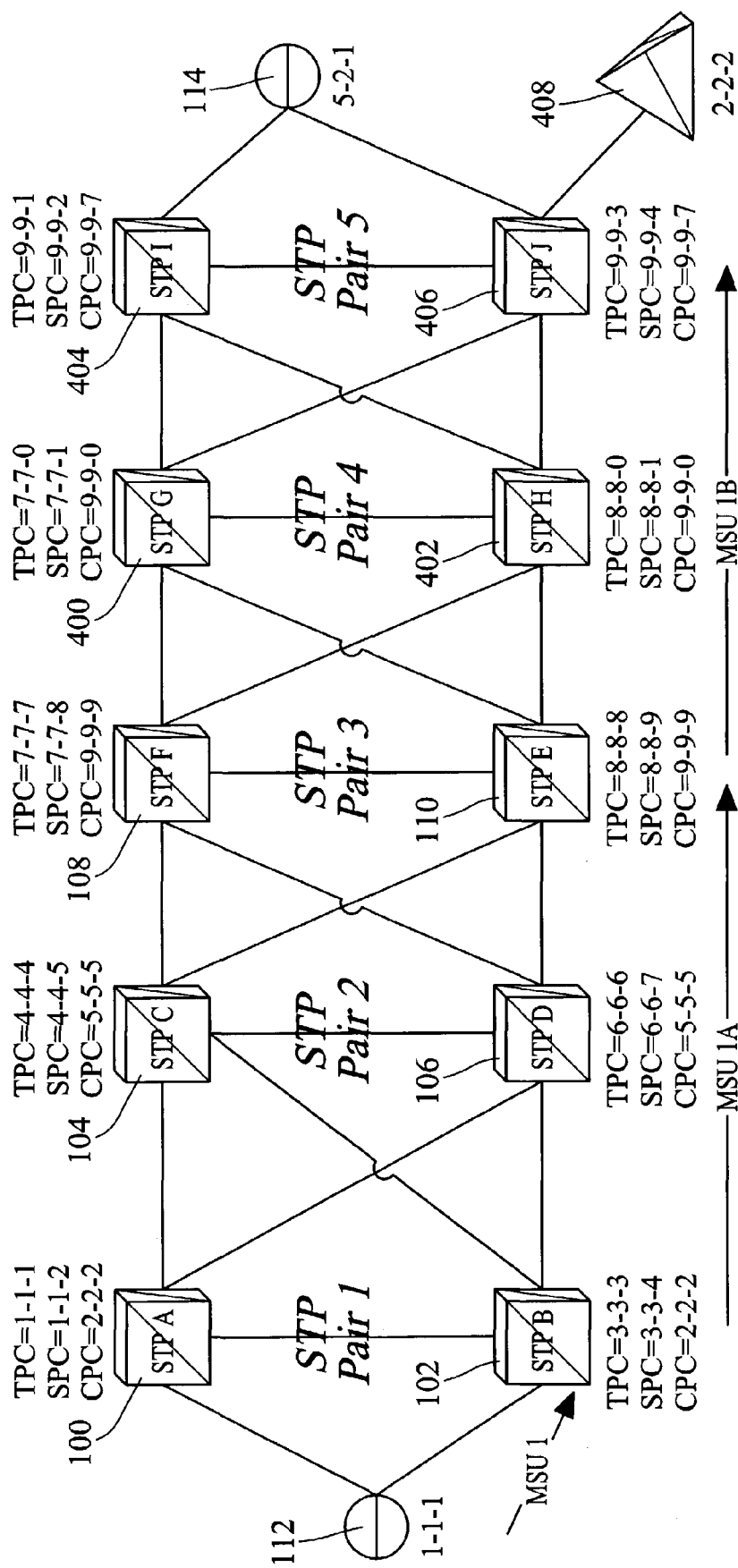
FIG. 11 is a network diagram corresponding to the network illustrated in FIG. 4 of an exemplary message flow for a message from a non-adjacent STP destined for a non-adjacent STP in the concurring direction according to an embodiment of the present invention.

FIG. 11 illustrates SCCP screening for an inbound message from a non-adjacent STP and an outbound message to a non-adjacent STP in the concurring direction. Referring to FIG. 11, SSP 112 originates MSU 1 and sends MSU 1 to STP B 102. STP B 102 performs global title translation for MSU 1 to produce MSU 1A. The destination point code for MSU 1A is assumed to be that of STP E 110. Accordingly, STP B 102 forwards MSU 1A to STP E 110. STP E 110 receives MSU 1A, performs global title translation to produce MSU 1B, determines if the message is from a non-adjacent STP and is directed to a non-adjacent STP in the concurring direction. Accordingly, from Table 1, STP E 110 correlates the true point code with the capability point codes of STP B. From Table 3, the true point code of STP B correlates to 2-2-2. Since 2-2-2 does not match the post-GTT DPC (9-9-7), MSU 1B passes SCCP loop detection. Accordingly, STP E 110 routes MSU 1B to its intended destination.

Figure 12:
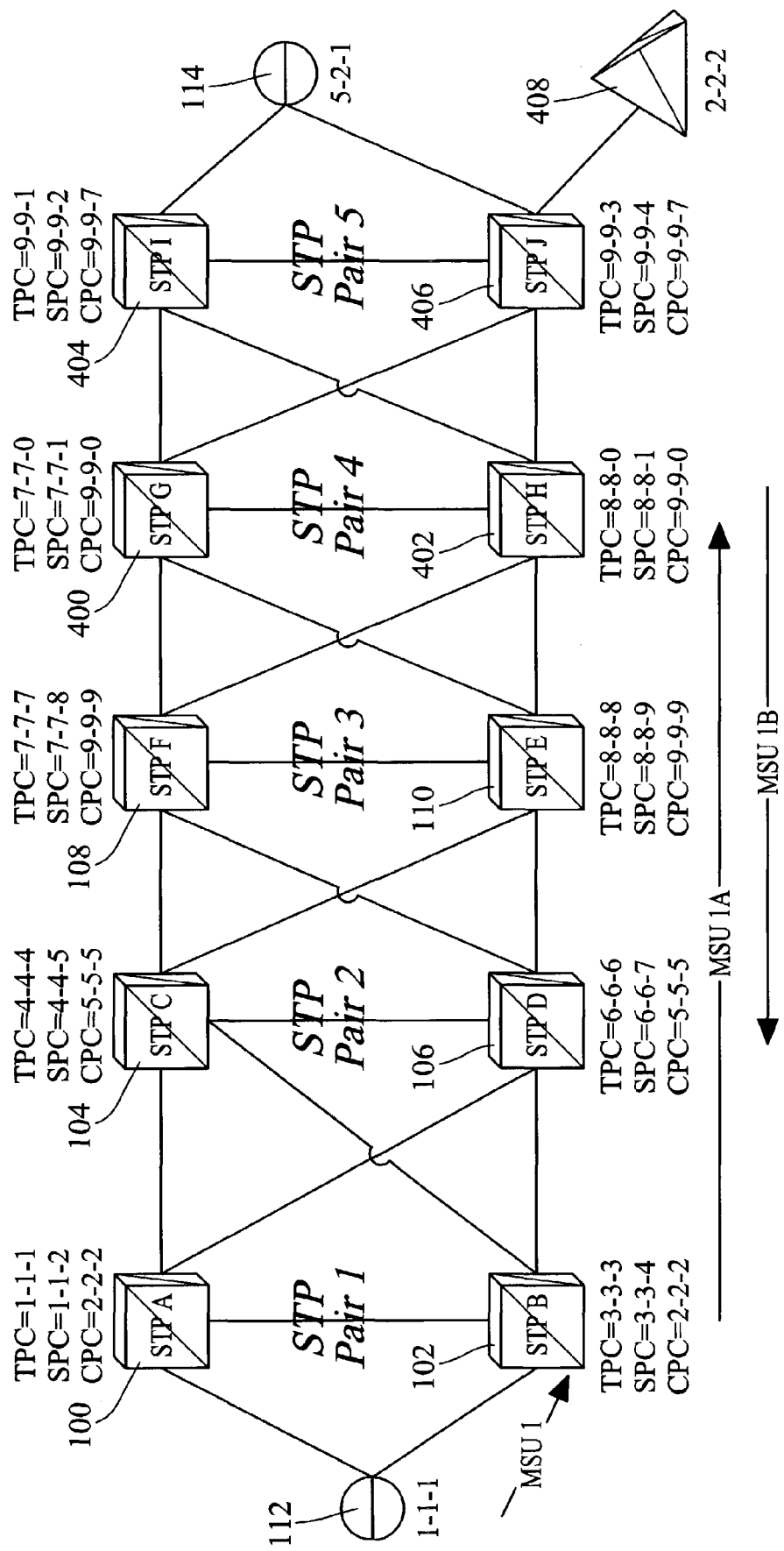
FIG. 12 is a network diagram corresponding to the network in FIG. 4 illustrating an exemplary message flow for a message from a non-adjacent STP destined for a non-adjacent STP in the opposing direction according to an embodiment of the present invention.

FIG. 12 illustrates exemplary SCCP loop detection for an inbound message from a non-adjacent STP and an outbound message to a non-adjacent STP in the opposing direction. Referring to FIG. 12, SSP 112 originates MSU 1 and forwards MSU 1 to STP B 102. STP B 102 global title translates MSU 1 to produce MSU 1A. MSU 1A has a destination point code of 8-8-0. Accordingly, STP B 102 forwards MSU 1A to STP H 402. STP H 402 performs global title translation for MSU 1A to produce MSU 1B. MSU 1B is assumed to have the following fields:

MTP OPC=8-8-0

MTP DPC=5-5-0

CGPA OPC=1-1-1

CDPA DPC=5-5-5

STP H 402 determines that MSU 1A is from a non-adjacent STP and MSU 1B is directed to a non-adjacent in the concurring direction. Accordingly, from Table 1, STP H correlates the true point code of STP B to all other STPs in its point code correlation table illustrated in Table 5. In Table 5, the true point code 3-3-3 of STP B 102 correlates to 2-2-2, 5-5-5, 9-9-9, 9-9-0, and 9-9-7. Since 5-5-5 matches the post-GTT DPC in MSU 1B, MSU 1B fails the looping check. Accordingly, STP H 402 preferably discards MSU 1B.

Networks Not Using Capability Point Codes

Figure 13:
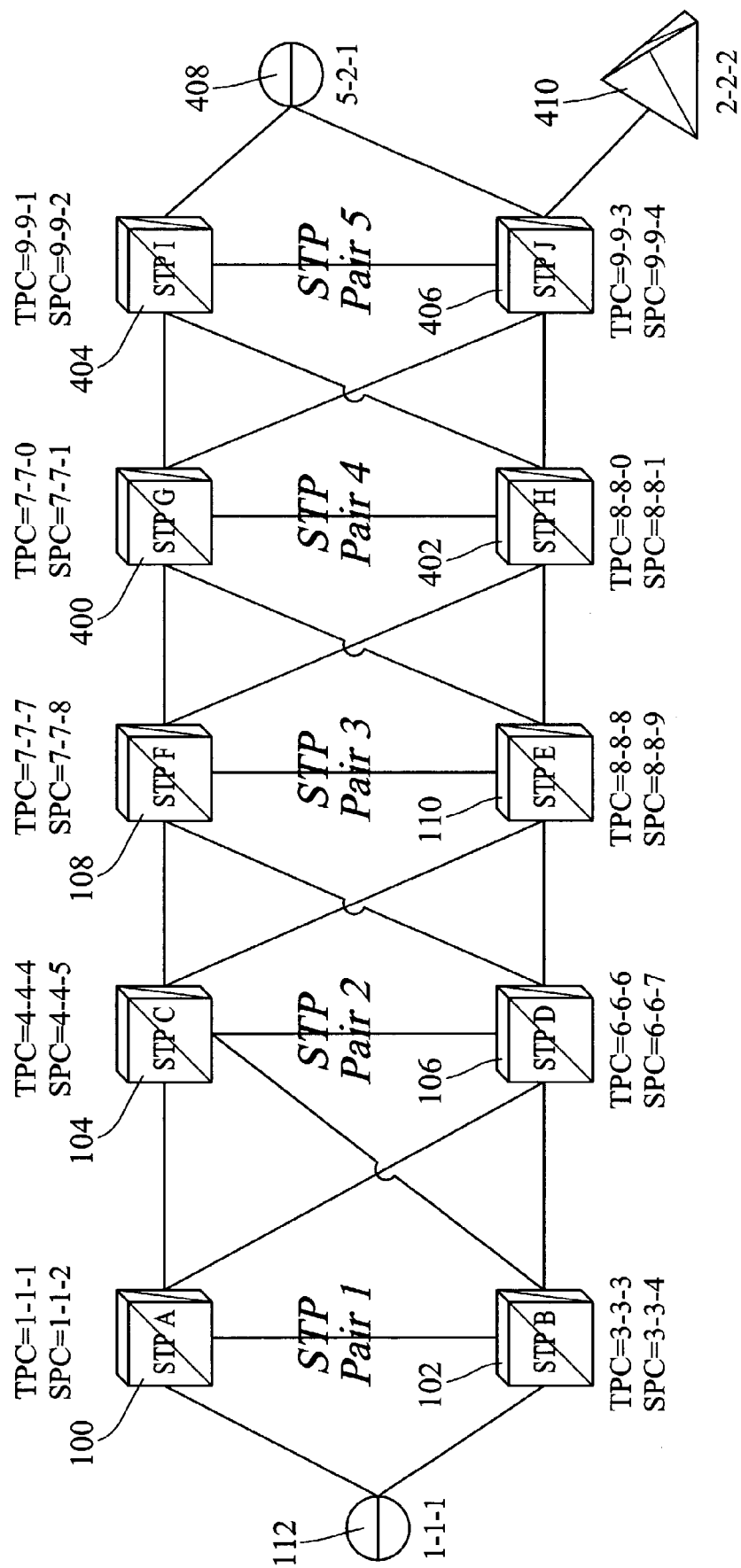
FIG. 13 is a network diagram illustrating an exemplary operating environment for an SCCP loop detector where nodes do not use capability point codes according to an embodiment of the present invention.

In some networks, network service providers may not use capability point codes to identify signal transfer points. An SCCP loop detector according to the present invention may be structured to prevent SCCP looping in such a network. FIG. 13 illustrates an exemplary network in which STPs do not use capability point codes. In FIG. 13, each network element is the same as the correspondingly numbered network elements in FIG. 4. However, in the illustrated example, each STP includes a true point code and a secondary point code but no capability point code. Table 7 shown below illustrates exemplary logic that may be used by the STPs illustrated in FIG. 13 in detecting and preventing SCCP looping. Similarly, Tables 8-12 are point code correlation tables that may be used by the correspondingly named STPs in FIG. 13 in detecting and preventing SCCP looping. The use of Tables 7-12 to detect SCCP looping will be illustrated below using specific message flow examples.

TABLE 7

SCCP Loop Detection Logic for STPs in Networks Where STPs Do Not Use CPCs

| Message Direction | Inbound Message | Outbound Message | Incoming OPC-Outbound DPC correlation |
|---|---|---|---|
| Concurring | Adjacent STP | Adjacent STP | Correlates PC to PC of originating STP |
| Opposing | Adjacent STP | Adjacent STP | Correlates PC to PC of originating STP |

TABLE 7-continued

SCCP Loop Detection Logic for STPs in Networks Where STPs Do Not Use CPCs

| Message Direction | Inbound Message | Outbound Message | Incoming OPC-Outbound DPC correlation |
|---|---|---|---|
| Concurring | Adjacent STP | Non-adjacent STP | Correlates PC to PC of originating STP |
| Opposing | Adjacent STP | Non-adjacent STP | Correlates all other PCs to PC of originating STP |
| Concurring | Non-adjacent STP | Adjacent STP | Correlates PC to PC of originating STP |
| Opposing | Non-adjacent STP | Adjacent STP | Correlates all other PCs to PC of originating STP |
| Concurring | Non-adjacent STP | Non-adjacent STP | Correlates PC to PC of originating STP |
| Opposing | Non-adjacent STP | Non-adjacent STP | Correlates all other PCs to PC of originating STP |

In Table 7, each row represents a rule that may be implemented by an SCCP loop detector in a network that does not use capability point codes. As with the capability point code example, the rules include correlating point codes of originating STPs and other STPs.

TABLE 8

TPC-TPC Mappings for STP B

| STP GROUP | STP ID | Self TPC | CPC | Other TPCs |
|---|---|---|---|---|
| STP PAIR 2 | STP D | 6-6-6 | — | 1-1-1 |
|  |  |  |  | 3-3-3 |
|  |  |  |  | 7-7-7 |
|  |  |  |  | 8-8-8 |
|  |  |  |  | 7-7-0 |
|  |  |  |  | 8-8-0 |
|  |  |  |  | 9-9-1 |
|  |  |  |  | 9-9-3 |
| STP PAIR 2 | STP C | 4-4-4 | — | 1-1-1 |
|  |  |  |  | 3-3-3 |
|  |  |  |  | 7-7-7 |
|  |  |  |  | 8-8-8 |
|  |  |  |  | 7-7-0 |
|  |  |  |  | 8-8-0 |
|  |  |  |  | 9-9-1 |
|  |  |  |  | 9-9-3 |
| STP PAIR 3 | STP F | 8-8-8 | — | 1-1-1 |
|  |  |  |  | 3-3-3 |
|  |  |  |  | 4-4-4 |
|  |  |  |  | 6-6-6 |
|  |  |  |  | 7-7-0 |
|  |  |  |  | 8-8-0 |
|  |  |  |  | 9-9-1 |
|  |  |  |  | 9-9-3 |
| STP PAIR 3 | STP E | 7-7-7 | — | 1-1-1 |
|  |  |  |  | 3-3-3 |
|  |  |  |  | 4-4-4 |
|  |  |  |  | 6-6-6 |
|  |  |  |  | 7-7-0 |
|  |  |  |  | 8-8-0 |
|  |  |  |  | 9-9-1 |
|  |  |  |  | 9-9-3 |
| STP PAIR 4 | STP G | 7-7-0 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 9-9-1 |
|  |  |  |  | 9-9-3 |
| STP PAIR 4 | STP H | 8-8-0 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 9-9-1 |
|  |  |  |  | 9-9-3 |
| STP PAIR 5 | STP I | 9-9-1 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 7-7-0 |
|  |  |  |  | 8-8-0 |
| STP PAIR 5 | STP J | 9-9-3 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 7-7-0 |
|  |  |  |  | 8-8-0 |

TABLE 9

TPC-TPC Mappings for STP D

| STP GROUP | STP ID | Self TPC | CPC | Other TPCs |
|---|---|---|---|---|
| STP PAIR 1 | STP A | 1-1-1 | — | 4-4-4 |
|  |  |  |  | 6-6-6 |
|  |  |  |  | 8-8-8 |
|  |  |  |  | 7-7-0 |
|  |  |  |  | 8-8-0 |
|  |  |  |  | 9-9-1 |
|  |  |  |  | 9-9-3 |
| STP PAIR 1 | STP B | 3-3-3 | — | 4-4-4 |
|  |  |  |  | 6-6-6 |
|  |  |  |  | 7-7-7 |
|  |  |  |  | 8-8-8 |
|  |  |  |  | 7-7-0 |
|  |  |  |  | 8-8-0 |
|  |  |  |  | 9-9-1 |
|  |  |  |  | 9-9-3 |
| STP PAIR 3 | STP F | 8-8-8 | — | 1-1-1 |
|  |  |  |  | 3-3-3 |
|  |  |  |  | 4-4-4 |
|  |  |  |  | 6-6-6 |
|  |  |  |  | 7-7-0 |
|  |  |  |  | 8-8-0 |
|  |  |  |  | 9-9-1 |
|  |  |  |  | 9-9-3 |
| STP PAIR 3 | STP E | 7-7-7 | — | 1-1-1 |
|  |  |  |  | 3-3-3 |
|  |  |  |  | 4-4-4 |
|  |  |  |  | 6-6-6 |
|  |  |  |  | 7-7-0 |
|  |  |  |  | 8-8-0 |
|  |  |  |  | 9-9-1 |
|  |  |  |  | 9-9-3 |
| STP PAIR 4 | STP G | 7-7-0 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 9-9-1 |
|  |  |  |  | 9-9-3 |

TABLE 9-continued

TPC-TPC Mappings for STP D

| STP GROUP | STP ID | Self TPC | CPC | Other TPCs |
|---|---|---|---|---|
| STP PAIR 4 | STP H | 8-8-0 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 9-9-1 |
|  |  |  |  | 9-9-3 |
| STP PAIR 5 | STP I | 9-9-1 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 7-7-0 |
|  |  |  |  | 8-8-0 |
| STP PAIR 5 | STP J | 9-9-3 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 7-7-0 |
|  |  |  |  | 8-8-0 |

TABLE 10

TPC-TPC Mappings for STP E

| STP GROUP | STP ID | Self TPC | CPC | Other TPCs |
|---|---|---|---|---|
| STP PAIR 1 | STP A | 1-1-1 | — | 4-4-4 |
|  |  |  |  | 6-6-6 |
|  |  |  |  | 8-8-8 |
|  |  |  |  | 7-7-0 |
|  |  |  |  | 8-8-0 |
|  |  |  |  | 9-9-1 |
|  |  |  |  | 9-9-3 |
| STP PAIR 1 | STP B | 3-3-3 | — | 4-4-4 |
|  |  |  |  | 6-6-6 |
|  |  |  |  | 7-7-7 |
|  |  |  |  | 8-8-8 |
|  |  |  |  | 7-7-0 |
|  |  |  |  | 8-8-0 |
|  |  |  |  | 9-9-1 |
|  |  |  |  | 9-9-3 |
| STP PAIR 2 | STP D | 6-6-6 | — | 1-1-1 |
|  |  |  |  | 3-3-3 |
|  |  |  |  | 7-7-7 |
|  |  |  |  | 8-8-8 |
|  |  |  |  | 8-8-0 |
|  |  |  |  | 9-9-1 |
|  |  |  |  | 9-9-3 |
| STP PAIR 2 | STP C | 4-4-4 | — | 1-1-1 |
|  |  |  |  | 3-3-3 |
|  |  |  |  | 7-7-7 |
|  |  |  |  | 8-8-8 |
|  |  |  |  | 7-7-0 |
|  |  |  |  | 8-8-0 |
|  |  |  |  | 9-9-1 |
|  |  |  |  | 9-9-3 |
| STP PAIR 4 | STP G | 7-7-0 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 9-9-1 |
|  |  |  |  | 9-9-3 |

TABLE 10-continued

TPC-TPC Mappings for STP E

| STP GROUP | STP ID | Self TPC | CPC | Other TPCs |
|---|---|---|---|---|
| STP PAIR 4 | STP H | 8-8-0 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 9-9-1 |
|  |  |  |  | 9-9-3 |
| STP PAIR 5 | STP I | 9-9-1 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 7-7-0 |
|  |  |  |  | 8-8-0 |
| STP PAIR 5 | STP J | 9-9-3 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 7-7-0 |
|  |  |  |  | 8-8-0 |

TABLE 11

TPC-TPC Mappings for STP H

| STP GROUP | STP ID | TPC | CPC | Other TPCs |
|---|---|---|---|---|
| STP PAIR 1 | STP A | 1-1-1 | — | 4-4-4 |
|  |  |  |  | 6-6-6 |
|  |  |  |  | 8-8-8 |
|  |  |  |  | 7-7-0 |
|  |  |  |  | 8-8-0 |
|  |  |  |  | 9-9-1 |
|  |  |  |  | 9-9-3 |
| STP PAIR 1 | STP B | 3-3-3 | — | 4-4-4 |
|  |  |  |  | 6-6-6 |
|  |  |  |  | 7-7-7 |
|  |  |  |  | 8-8-8 |
|  |  |  |  | 7-7-0 |
|  |  |  |  | 8-8-0 |
|  |  |  |  | 9-9-1 |
|  |  |  |  | 9-9-3 |
| STP PAIR 2 | STP D | 6-6-6 | — | 1-1-1 |
|  |  |  |  | 3-3-3 |
|  |  |  |  | 7-7-7 |
|  |  |  |  | 8-8-8 |
|  |  |  |  | 8-8-0 |
|  |  |  |  | 9-9-1 |
|  |  |  |  | 9-9-3 |
| STP PAIR 2 | STP C | 4-4-4 | — | 1-1-1 |
|  |  |  |  | 3-3-3 |
|  |  |  |  | 7-7-7 |
|  |  |  |  | 8-8-8 |
|  |  |  |  | 7-7-0 |
|  |  |  |  | 8-8-0 |
|  |  |  |  | 9-9-1 |
|  |  |  |  | 9-9-3 |
| STP PAIR 3 | STP F | 8-8-8 | — | 1-1-1 |
|  |  |  |  | 3-3-3 |
|  |  |  |  | 4-4-4 |
|  |  |  |  | 6-6-6 |
|  |  |  |  | 7-7-0 |
|  |  |  |  | 8-8-0 |
|  |  |  |  | 9-9-1 |
|  |  |  |  | 9-9-3 |

TABLE 11-continued

TPC-TPC Mappings for STP H

| STP GROUP | STP ID | TPC | CPC | Other TPCs |
|---|---|---|---|---|
| STP PAIR 3 | STP E | 7-7-7 | — | 1-1-1 |
|  |  |  |  | 3-3-3 |
|  |  |  |  | 4-4-4 |
|  |  |  |  | 6-6-6 |
|  |  |  |  | 7-7-0 |
|  |  |  |  | 8-8-0 |
|  |  |  |  | 9-9-1 |
|  |  |  |  | 9-9-3 |
| STP PAIR 5 | STP I | 9-9-1 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 7-7-0 |
|  |  |  |  | 8-8-0 |
| STP PAIR 5 | STP J | 9-9-3 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 7-7-0 |
|  |  |  |  | 8-8-0 |

TABLE 12

TPC-SPC Mappings for STP J

| STP GROUP | STP ID | Self TPC | CPC | Other TPCs |
|---|---|---|---|---|
| STP PAIR 1 | STP A | 1-1-1 | — | 4-4-4 |
|  |  |  |  | 6-6-6 |
|  |  |  |  | 8-8-8 |
|  |  |  |  | 7-7-0 |
|  |  |  |  | 8-8-0 |
|  |  |  |  | 9-9-1 |
|  |  |  |  | 9-9-3 |
| STP PAIR 1 | STP B | 3-3-3 | — | 4-4-4 |
|  |  |  |  | 6-6-6 |
|  |  |  |  | 7-7-7 |
|  |  |  |  | 8-8-8 |
|  |  |  |  | 7-7-0 |
|  |  |  |  | 8-8-0 |
|  |  |  |  | 9-9-1 |
|  |  |  |  | 9-9-3 |
| STP PAIR 2 | STP D | 6-6-6 | — | 1-1-1 |
|  |  |  |  | 3-3-3 |
|  |  |  |  | 7-7-7 |
|  |  |  |  | 8-8-8 |
|  |  |  |  | 8-8-0 |
|  |  |  |  | 9-9-1 |
|  |  |  |  | 9-9-3 |
| STP PAIR 2 | STP C | 4-4-4 | — | 1-1-1 |
|  |  |  |  | 3-3-3 |
|  |  |  |  | 7-7-7 |
|  |  |  |  | 8-8-8 |
|  |  |  |  | 7-7-0 |
|  |  |  |  | 8-8-0 |
|  |  |  |  | 9-9-1 |
|  |  |  |  | 9-9-3 |
| STP PAIR 3 | STP F | 8-8-8 | — | 1-1-1 |
|  |  |  |  | 3-3-3 |
|  |  |  |  | 4-4-4 |
|  |  |  |  | 6-6-6 |
|  |  |  |  | 7-7-0 |
|  |  |  |  | 8-8-0 |
|  |  |  |  | 9-9-1 |
|  |  |  |  | 9-9-3 |
| STP PAIR 3 | STP E | 7-7-7 | — | 1-1-1 |
|  |  |  |  | 3-3-3 |
|  |  |  |  | 4-4-4 |
|  |  |  |  | 6-6-6 |
|  |  |  |  | 7-7-0 |
|  |  |  |  | 8-8-0 |
|  |  |  |  | 9-9-1 |
|  |  |  |  | 9-9-3 |
| STP PAIR 4 | STP G | 7-7-0 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 9-9-1 |
|  |  |  |  | 9-9-3 |
| STP PAIR 4 | STP H | 8-8-0 | — | 1-1-1 |
|  |  |  |  | 3-3-3 |
|  |  |  |  | 4-4-4 |
|  |  |  |  | 6-6-6 |
|  |  |  |  | 7-7-7 |
|  |  |  |  | 8-8-8 |
|  |  |  |  | 9-9-1 |
|  |  |  |  | 9-9-3 |

As with the examples discussed above, each STP may be provisioned with pair IDs for the other STPs and point codes for the individual STPs in the pair. This allows each STP to determine whether an STP is adjacent or nonadjacent and whether a message flow is in the concurring or the opposing direction.

Figure 14:
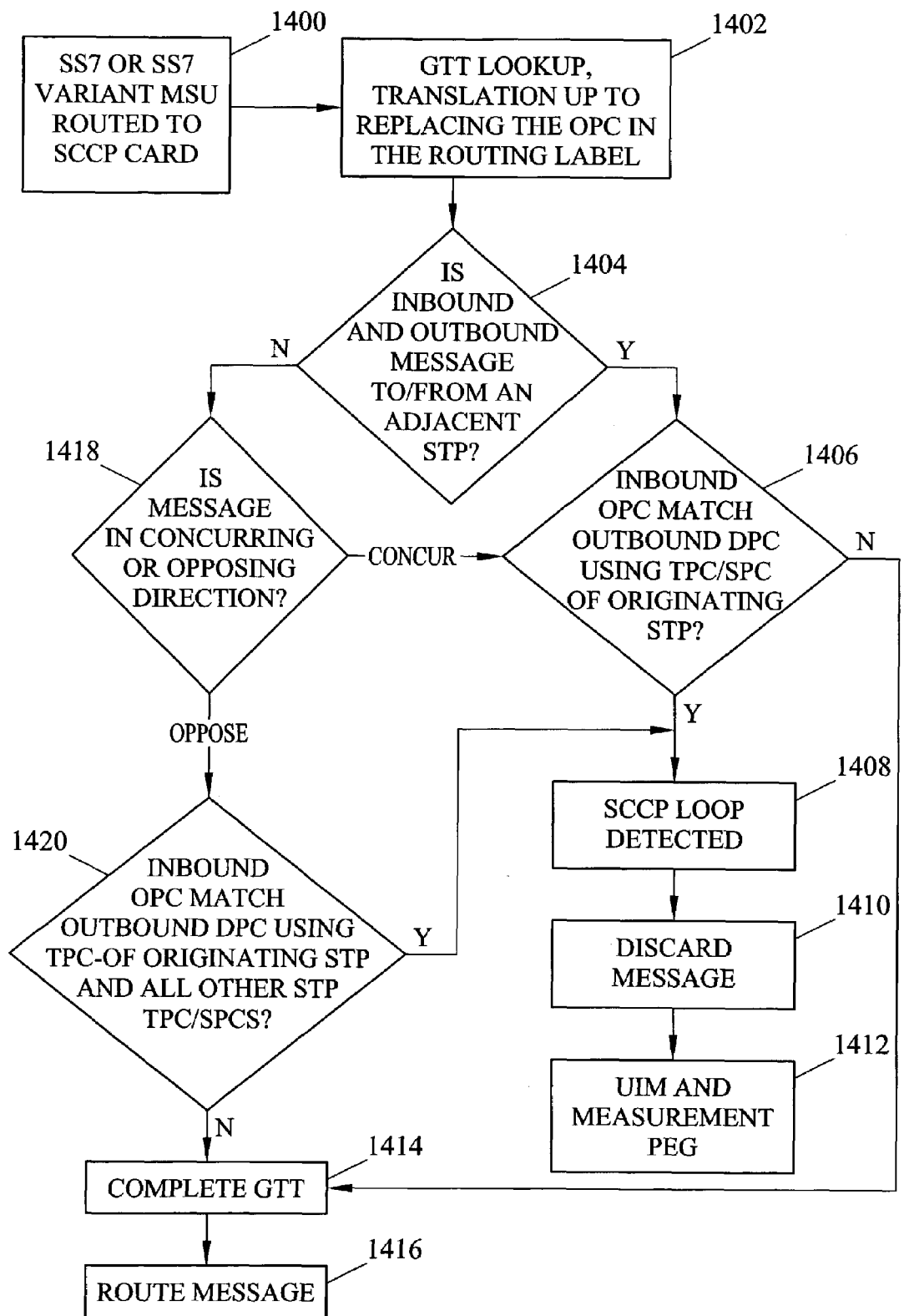
FIG. 14 is a flow chart illustrating exemplary steps that may be performed by an SCCP loop detector in a network in which capability point codes are not used according to an embodiment of the present invention.

FIG. 14 is a flow chart illustrating exemplary steps that may be performed by an STP in detecting and preventing SCCP looping in a network in which nodes do not use capability point codes. Referring to FIG. 14, in step 1400, an STP receives an MSU and routes the MSU to an SCCP card. In step 1402, the STP performs a global title translation lookup and translates the MTP DPC in the message but does not replace the OPC. In step 1404, the STP determines whether the inbound message is from an adjacent STP and whether the outbound message is to an adjacent STP. If the answer to both of these inquires is yes, control proceeds to step 1406 where the STP determines whether the inbound OPC matches the outbound DPC of the originating STP. If the post-GTT DPC matches the inbound OPC, an SCCP loop is detected, as indicated by step 1408. Accordingly, control proceeds to step 1410 where the message is discarded. In step 1412, the STP generates a UIM and measurement peg. Returning to step 1406, if the inbound OPC does not match the post-GTT DPC, the message passes SCCP looping, and control proceeds to step 1414 where the global title translation is completed. In step 1416, the message is routed to its intended destination.

Returning to step 1404, if the inbound message is not from an adjacent STP and/or the outbound message is not to an adjacent STP, control proceeds to step 1418 where the STP determines whether the message is in a concurring or opposing direction. If the message is in a concurring direction, control proceeds to steps 1406-1416 where loop detection is performed based on the post-GTT DPC and the originating OPC. If the message is in the opposing direction, control proceeds to step 1420 where the STP determines whether the inbound OPC matches the outbound DPC using the TPC of the originating STP and all other STPs for which loop detection is desired. If the inbound OPC matches any of these DPCs, control proceeds to steps 1408-1412 where an SCCP loop is detected and the message is discarded. If the message does not match any of the DPCs, control proceeds to steps 1414 and 1416 where the message is routed to its intended destination.

Figure 15:
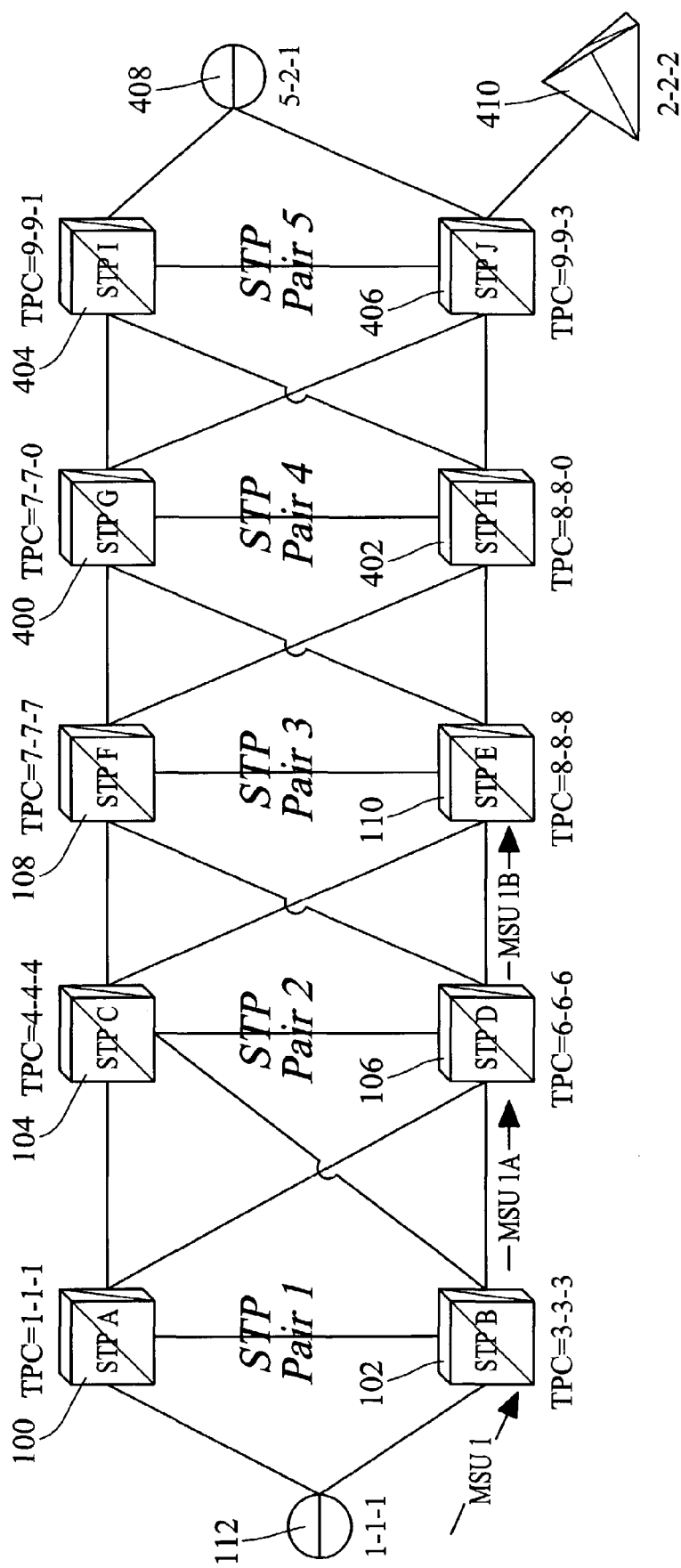
FIG. 15 is a network diagram corresponding to the network in FIG. 13 illustrating an exemplary message flow for an inbound message from an adjacent STP to an adjacent STP in the concurring direction according to an embodiment of the present invention.

FIG. 15 illustrates an exemplary message flow for an inbound message from an adjacent STP and an outbound message to an adjacent STP in the concurring direction. Referring to FIG. 15, SSP 112 originates MSU 1 and addresses MSU 1 to STP B 102. STP B 102 performs global title translation on MSU 1 to produce MSU 1A. The OPC in MSU 1*a* is 3-3-3. The DPC in MSU 1A is that of STP D 106.

STP D 106 receives MSU 1A and performs global title translation to produce MSU 1B. MSU 1B is assumed to have the following fields:

MTP OPC=6-6-6

MTP DPC=8-8-8

CGPA OPC=1-1-1

CDPA DPC=8-8-8.

STP D 106 determines that the incoming messages from the adjacent STP and the outgoing messages are to an adjacent STP in the concurring direction. Accordingly, from Table 7, STP D 106 checks whether the post-GTT DPC (8-8-8) matches the point code of the originating node (3-3-3). Since there is no match, the message passes SCCP looping and STP D 106 routes the message to its intended destination.

Figure 16:
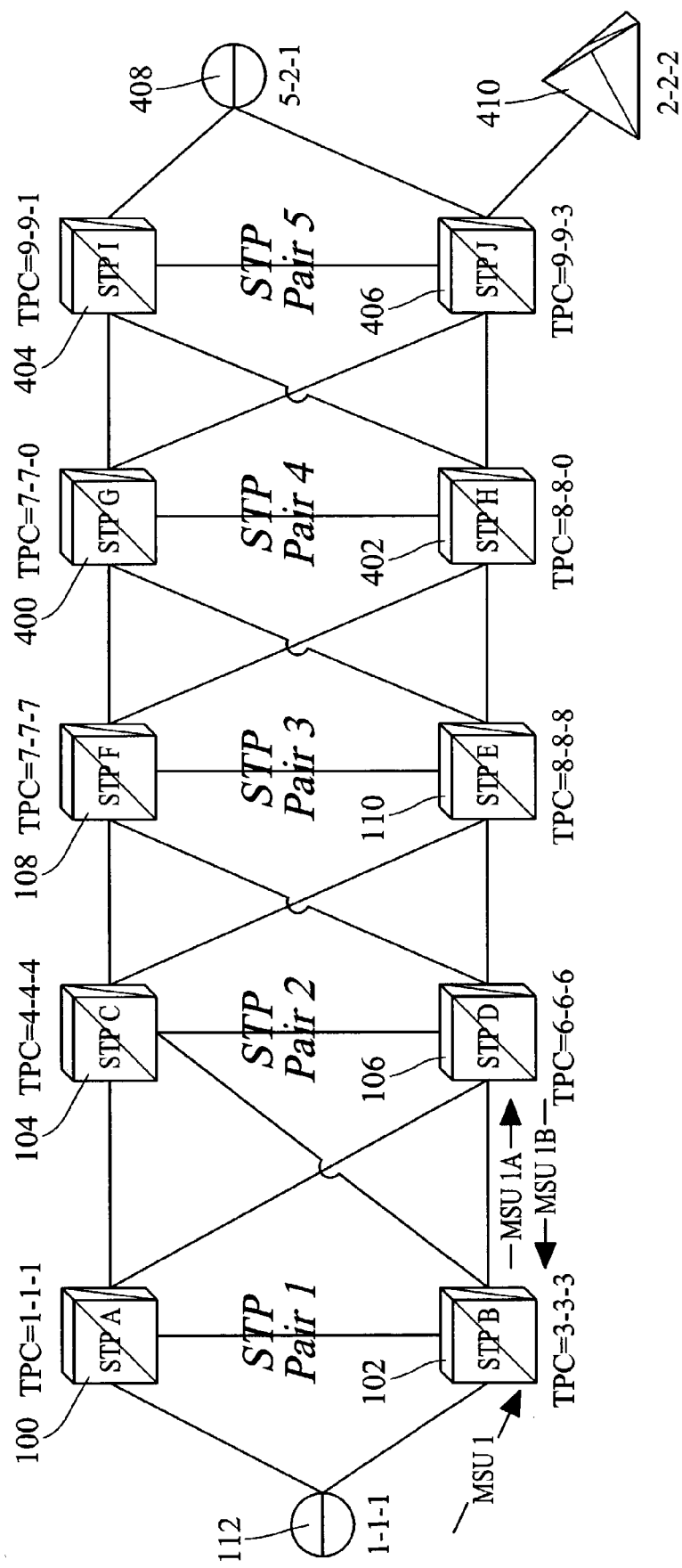
FIG. 16 is a network diagram corresponding to the network in FIG. 13 illustrating an exemplary message flow for a message from an adjacent STP to an adjacent STP in the opposing direction according to an embodiment of the present invention.

FIG. 16 is a message flow illustrating exemplary SCCP loop detection for an inbound message from an adjacent STP and an outbound message to an adjacent STP in the opposing direction. Referring to FIG. 16, SSP 112 originates MSU 1 and forwards MSU 1 to STP B 102. STP B 102 global title translates MSU 1 to produce MSU 1A. MSU 1A includes an OPC of 3-3-3 and a DPC of 6-6-6. Accordingly, STP B 102 routes MSU 1A to STP D 106.

STP D 106 receives MSU 1A and global title translates MSU 1A to produce MSU 1B. MSU 1B is assumed to have the following fields:

MTP OPC=6-6-6

MTP DPC=3-3-3

CGPA OPC=1-1-1

CDPA DPC=6-6-6.

STP D 106 determines that the incoming messages from an adjacent node and the outgoing messages to an adjacent node in the opposing direction. Accordingly, from Table 1, STP D 106 compares the post-GTT DPC to the OPC in the received message. Since the post-GTT DPC (3-3-3) matches the originating message OPC, SCCP looping is detected. Accordingly, STP D 106 preferably discards MSU 1B.

Figure 17:
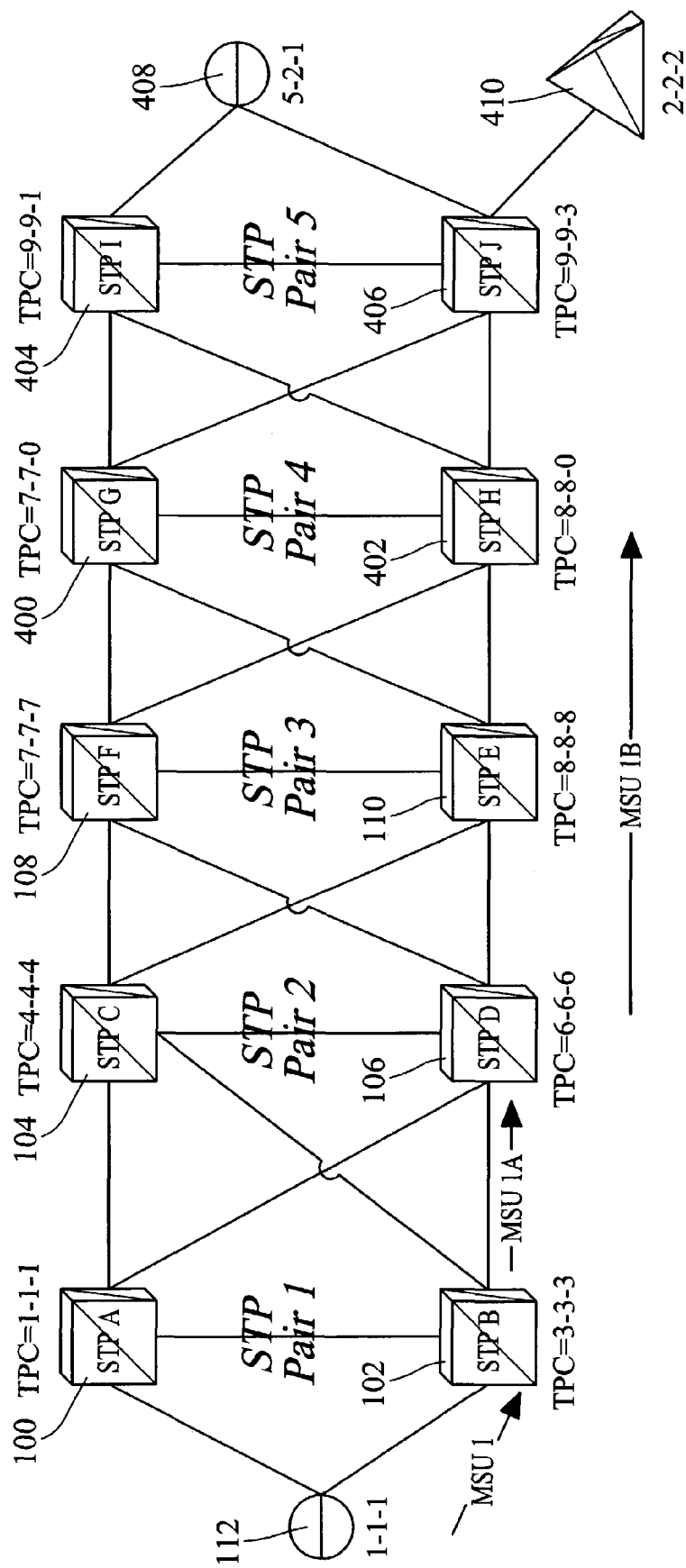
FIG. 17 is a network diagram corresponding to the network in FIG. 13 illustrating an exemplary message flow for a message from an adjacent STP to a non-adjacent STP in the concurring direction according to an embodiment of the present invention.

FIG. 17 is a message flow diagram illustrating exemplary SCCP loop detection for an inbound message from an adjacent STP and an outbound message to a non-adjacent STP in the concurring direction. Referring to FIG. 17, SSP 112 originates MSU 1 and forwards MSU 1 to STP B 102. STP B 102 global title translates MSU 1 to produce MSU 1A. MSU 1A is addressed to STP D 106. Accordingly, STP B 102 forwards MSU 1A to STP D 106.

STP D 106 global title translates MSU 1A to produce MSU 1B. MSU 1B is assumed to have the following fields:

MTP OPC=6-6-6

MTP DPC=8-8-0

CGPA OPC=1-1-1

CDPA DPC=8-8-0.

STP D 106 determines that the incoming message is from an adjacent STP and that the outgoing message is to a non-adjacent STP in the concurring direction. Accordingly, from Table 1, STP D 106 preferably correlates the post-GTT DPC to the OPC in the received message. In this case, because the post-GTT DPC (8-8-0) does not match the OPC in MSU 1A (3-3-3), the message passes SCCP loop detection.

Figure 18:
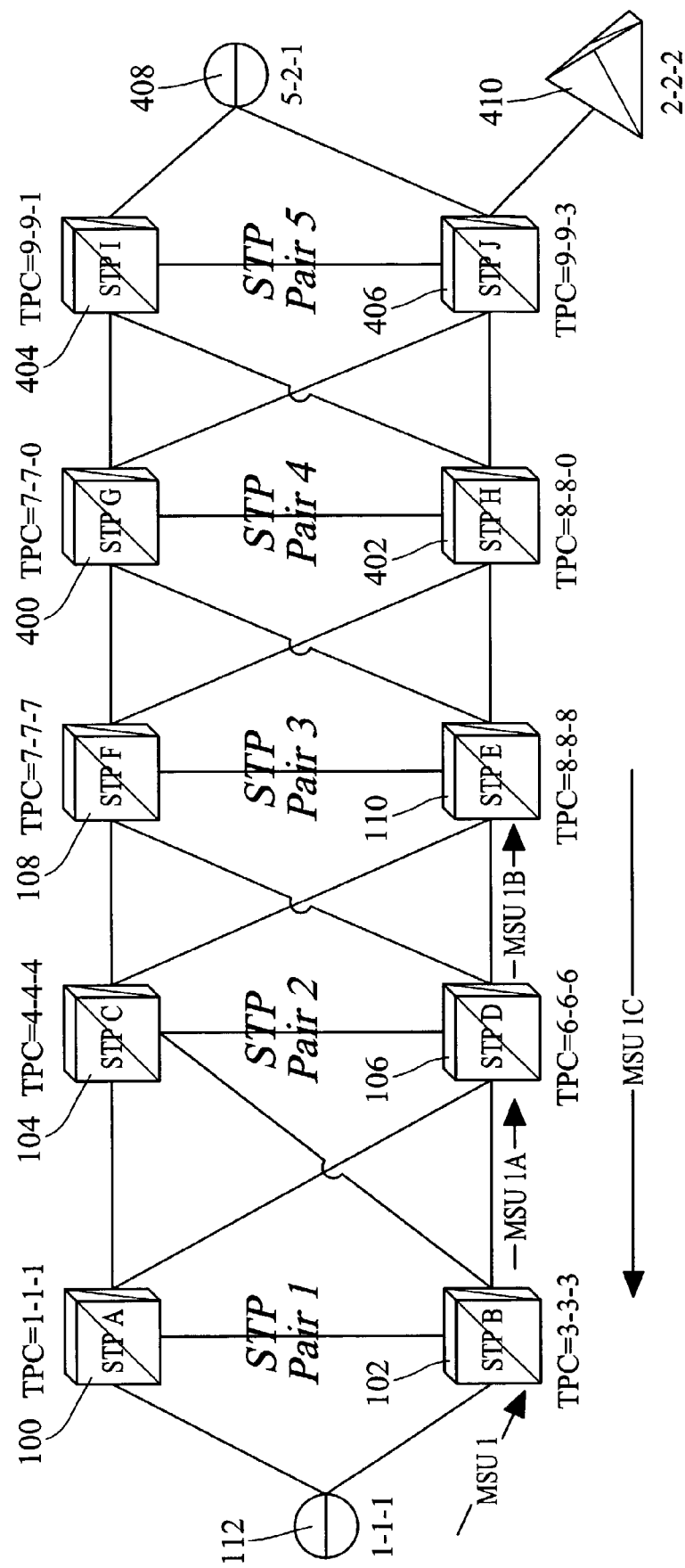
FIG. 18 is a network diagram corresponding to the network in FIG. 13 illustrating an exemplary message flow for an inbound message from an adjacent STP to a non-adjacent STP in the opposing direction according to an embodiment of the present invention.

FIG. 18 is a message flow diagram illustrating SCCP loop detection for an inbound message from an adjacent STP and an outbound message to a non-adjacent STP in the opposing direction. Referring to FIG. 18, SSP 112 originates MSU 1 and forwards MSU 1 to STP B 102. STP B 102 global title translates MSU 1 to produce MSU 1A. STP B 102 forwards MSU 1A to STP D 106.

STP D 106 global title translates MSU 1A to produce MSU 1B. MSU 1B is assumed to have a destination point code of 8-8-8. Accordingly, STP D 106 forwards MSU TB to STP E 110.

STP E 110 global title translates MSU 1*b* to produce MSU 1*c*. MSU 1*c* is assumed to have the following fields:

MTP OPC=8-8-8

MTP DPC=3-3-3

CGPA OPC=1-1-1

CDPA DPC=3-3-3.

STP E 110 determines that the incoming message is from an adjacent STP and that the outgoing message is to a non-adjacent STP in the opposing direction. Accordingly, from Table 7, STP E 110 correlates the true point code of STP D (6-6-6) to all other TPCs/SPCs shown in the point code correlation table (Table 10). From Table 10, one of the point codes that 6-6-6 correlates to is 3-3-3. Since 3-3-3 matches the MTP DPC in the message, MSU 1C fails SCCP loop detection and STP E 110 preferably discards MSU 1C.

Figure 19:
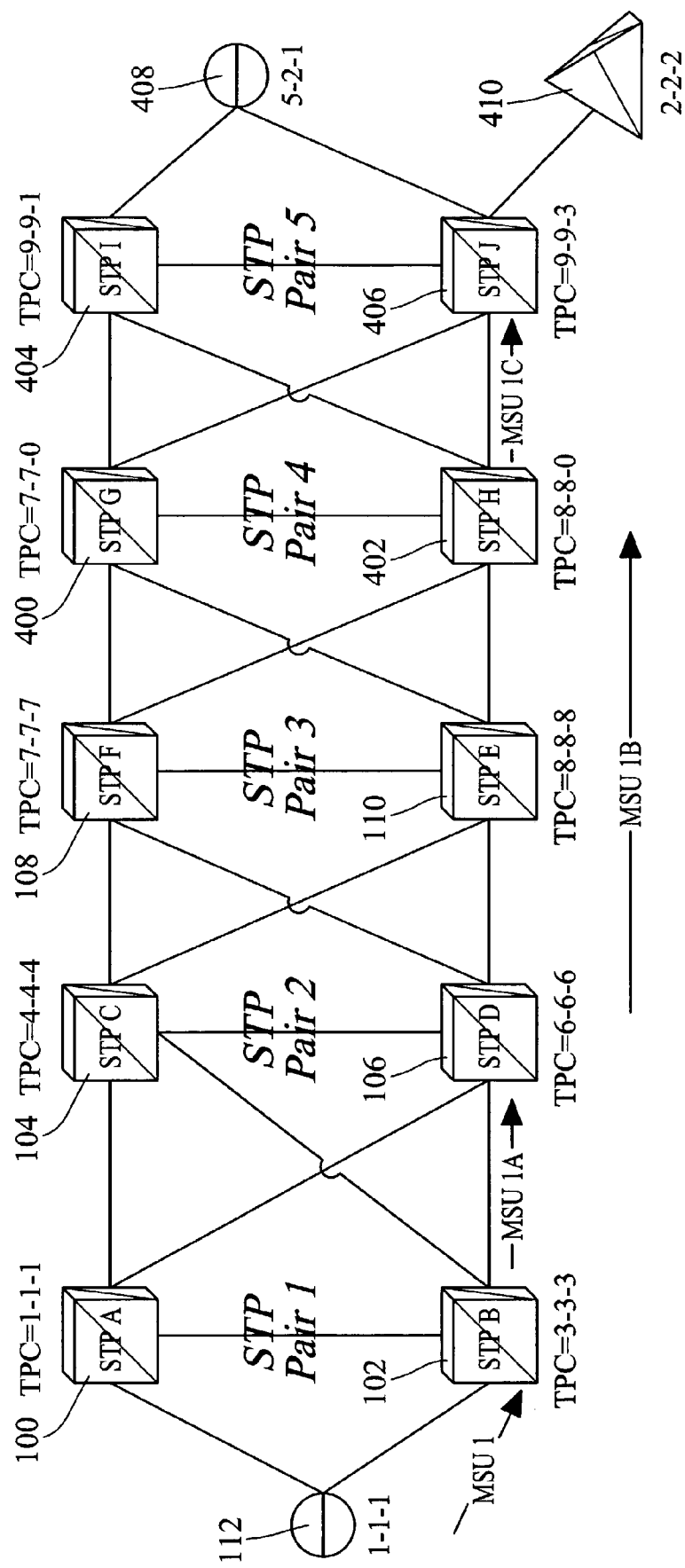
FIG. 19 is a network diagram corresponding to the network in FIG. 13 illustrating an exemplary message flow for a message from an adjacent STP to a non-adjacent STP in the concurring direction according to an embodiment of the present invention.

FIG. 19 is a message flow diagram illustrating exemplary SCCP loop detection for an inbound message from a non-adjacent STP and an outbound message to an adjacent STP in the concurring direction. Referring to FIG. 19, SSP 112 originates MSU 1 and forwards MSU 1 to STP B 102. STP B 102 global title translates MSU 1 to produce MSU 1A. MSU 1A has a DPC of 6-6-6. Accordingly, STP B 102 forwards MSU 1A to STP D 106.

STP D 106 global title translates MSU 1A to produce MSU 1B. MSU 1B has a destination point code of 8-8-8. Accordingly, STP D 106 routes MSU 1B to STP H 402.

STP H 402 receives MSU 1B and global title translates MSU 1B to produce MSU 1C. MSU 1C is assumed to have the following values after global title translation:

MTP OPC=8-8-0

MTP DPC=9-9-3

CGPA OPC=1-1-1

CDPA DPC=9-9-3.

STP H 402 determines that the incoming message is from a non-adjacent STP and that the outgoing message is to an adjacent STP in the concurring direction. Accordingly, from Table 7, STP H 402 preferably compares the incoming OPC to the post-GTT DPC. Since the incoming message OPC (6-6-6) does not match the post-GTT DPC (9-9-3), MSU 1C passes SCCP loop detection and is routed to its intended destination.

Figure 20:
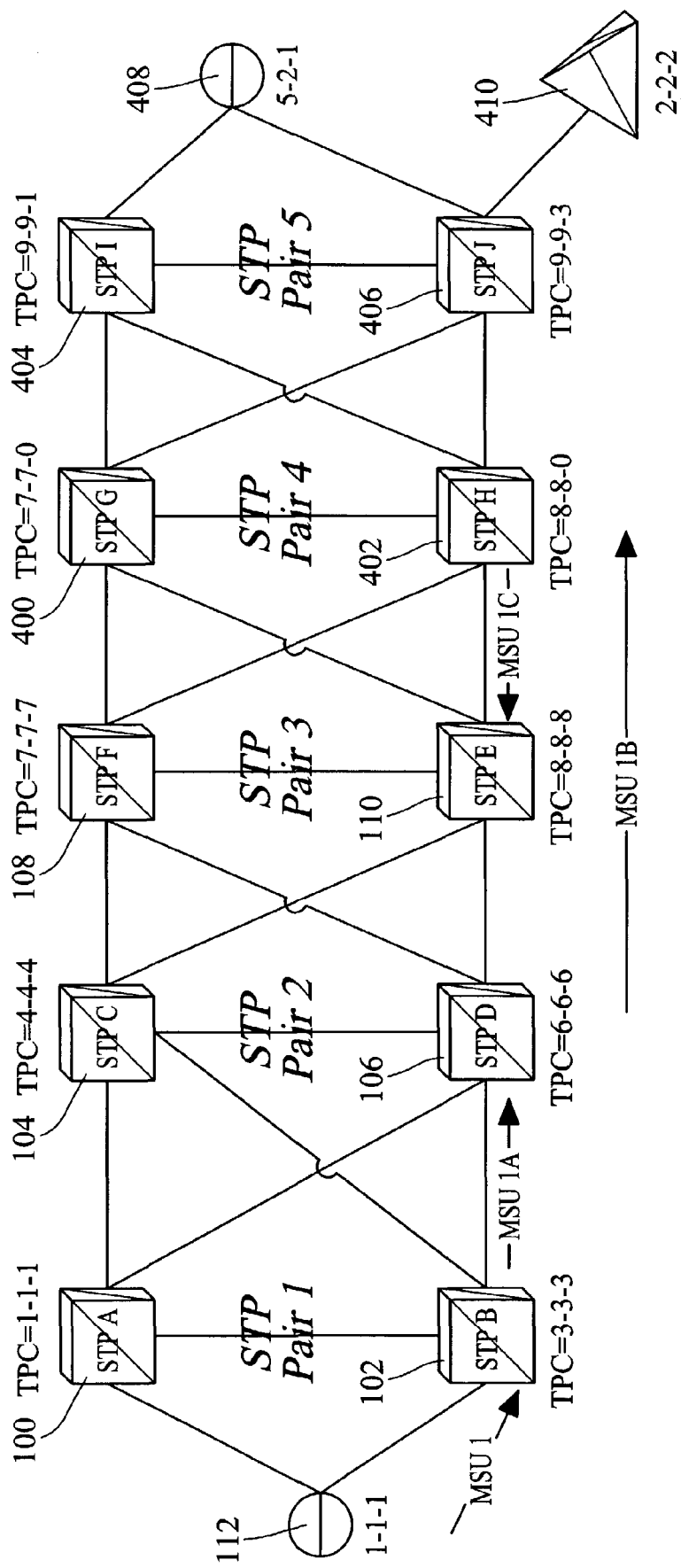
FIG. 20 is a network diagram corresponding to the network in FIG. 13 illustrating an exemplary message flow for an inbound message from a non-adjacent STP to an adjacent STP in the opposing direction according to an embodiment of the present invention.

FIG. 20 is a message flow diagram illustrating exemplary SCCP loop detection for an inbound message from a non-adjacent STP and an outbound message to an adjacent STP in the opposing direction. Referring to FIG. 20, SSP 112 originates MSU 1 and forwards MSU 1 to STP B 102. STP B 102 global title translates MSU 1 to produce MSU 1A. MSU 1A has a post-GTT DPC of 6-6-6. Accordingly, STP B 102 forwards MSU 1A to STP D 106.

STP D 106, upon receiving MSU 1A, performs global title translation to produce MSU 1B. The post-GTT DPC of MSU 1B is assumed to be 8-8-0. Accordingly, STP D 106 forwards MSU 1b to STP H 302.

STP H 402, upon receiving MSU 1B, global title translates MSU 1B to produce MSU 1C. MSU 1C is assumed to have the following fields after global title translation:

MTP OPC=6-6-6

MTP DPC=8-8-0

CGPA OPC=1-1-1

CDPA DPC=8-8-0.

STP H 402 determines that the incoming message is from a non-adjacent STP and the outgoing message is to an adjacent STP in the opposing direction. Accordingly, STP H 402 correlates the OPC in the originating message to all other point codes in its point code correlation table. Referring to Table 11, 6-6-6 correlates to 4-4-4, 6-6-6, 7-7-7, 8-8-8, 7-7-0, 8-8-0, 9-9-1, and 9-9-3. Since 8-8-0 matches the post-GTT DPC, MSU 1C fails loop detection and is preferably discarded.

Figure 21:
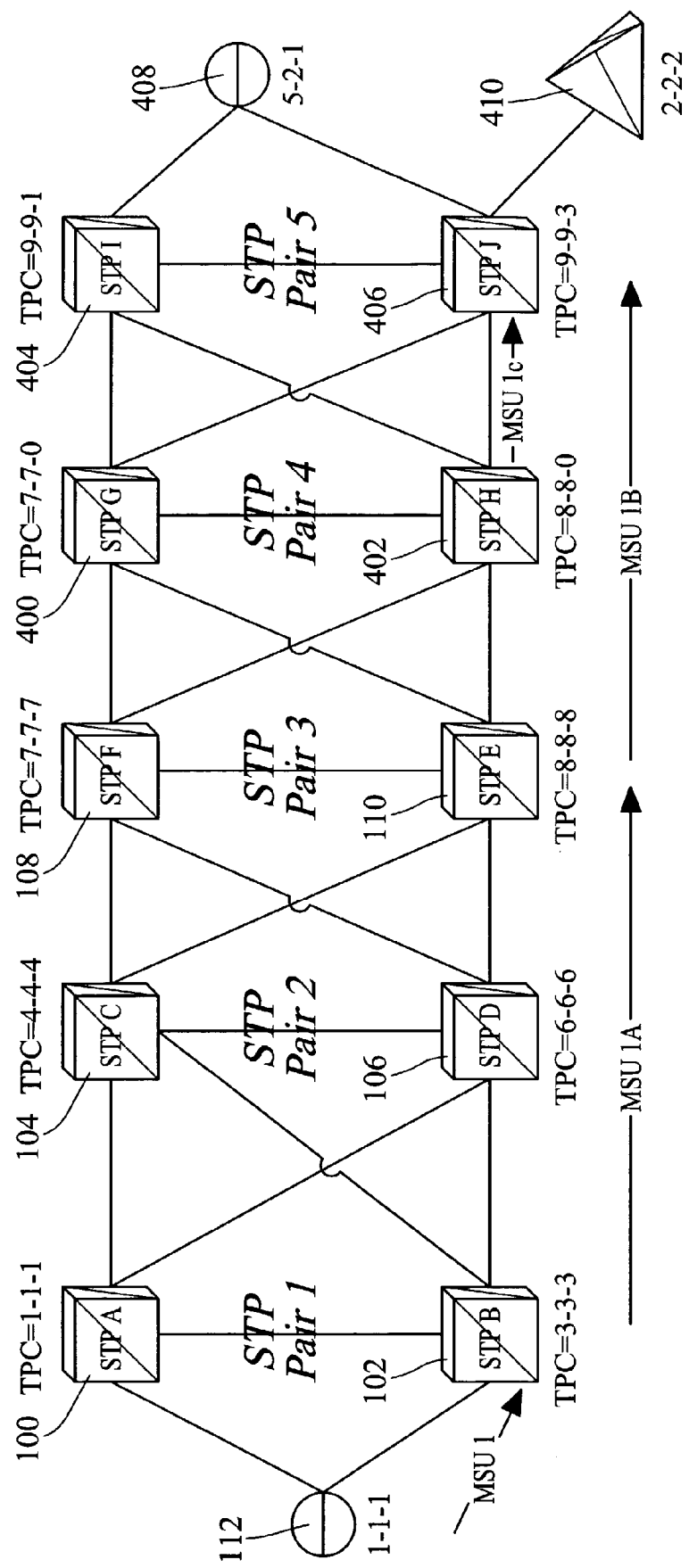
FIG. 21 is a network diagram corresponding to the network in FIG. 13 illustrating an exemplary message flow for a message from a non-adjacent STP to a non-adjacent STP in the concurring direction according to an embodiment of the present invention.

FIG. 21 is a message flow diagram illustrating exemplary SCCP loop detection for an inbound message from a non-adjacent STP and an outbound message to a non-adjacent STP in the concurring direction. Referring to FIG. 21, SSP 112 originates MSU 1 and forwards MSU 1 to STP B 102. STP B 102 performs global title translation to produce MSU 1A. The post-GTT DPC of MSU 1a is 8-8-8. Accordingly, STP B 102 forwards MSU 1a to STP E 110.

STP E 110 receives MSU 1A and global title translates MSU 1A to produce MSU 1B. MSU 1B is assumed to have the following fields:

MTP OPC=8-8-8

MTP DPC=9-9-3

CGPA OPC=1-1-1

CDPA DPC=9-9-3.

STP E 110 determines that MSU 1A is from a non-adjacent STP and MSU 1B is to a non-adjacent STP in the concurring direction. Accordingly, from Table 7, STP E 110 compares the post-GTT DPC (9-9-3) to the incoming message OPC (3-3-3). Since there is no match, MSU 1B passes loop detection and is routed to its intended destination.

Figure 22:
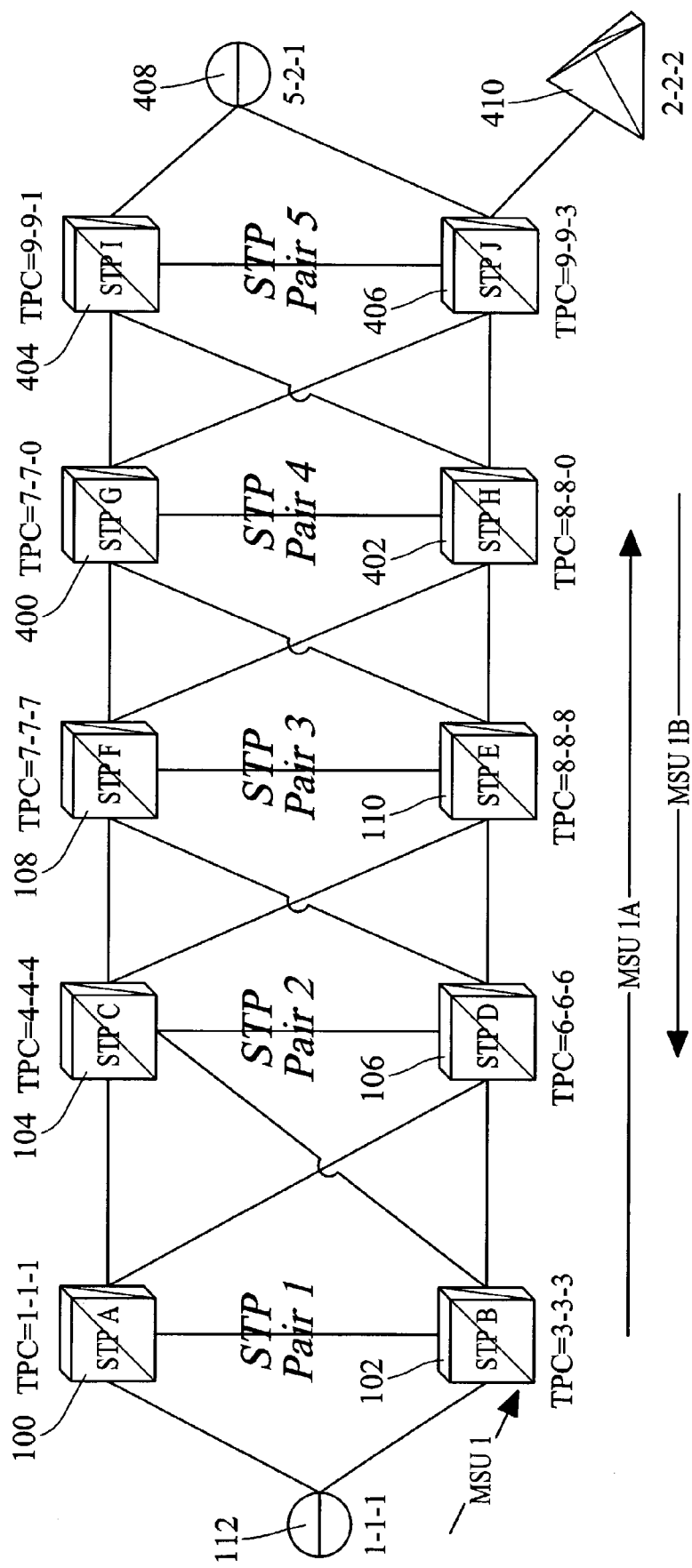
FIG. 22 is a network diagram corresponding to the network in FIG. 13 illustrating an exemplary message flow for an inbound message from a non-adjacent STP to a non-adjacent STP in the opposing direction according to an embodiment of the present invention.

FIG. 22 is a message flow diagram illustrating exemplary SCCP loop detection for an inbound message from a non-adjacent STP and an outbound message to a non-adjacent STP in the opposing direction. Referring to FIG. 22, SSP 112 originates MSU 1 and forwards MSU 1 to STP B 102. STP B 102 global title translates MSU 1 to produce MSU 1A. MSU 1A is assumed to have a destination point code of 8-8-0. Accordingly, STP B 102 routes MSU 1A to STP H 302.

STP H 402, upon receiving MSU 1A, global title translates MSU 1A to produce MSU 1B. MSU 1B is assumed to have the following values after global title translation:

MTP OPC=8-8-0

MTP DPC=6-6-6

CGPA OPC=1-1-1

CDPA DPC=6-6-6.

STP H 402 determines that the incoming message is from a non-adjacent STP and the outgoing message is to a non-adjacent STP in the opposing direction. Accordingly, from Table 7, STP H 402 correlates the OPC in the inbound message to all point codes in its point code correlation table. Referring to Table 11, the incoming message OPC (3-3-3) correlates to 4-4-4, 6-6-6, 7-7-7, 8-8-8, 7-7-0, 8-8-0, 9-9-1, and 9-9-3. Since 6-6-6 match the post-GGT DPC MSU 1B fails loop detection and is preferably discarded.

Thus, using the logic and tables described above, the embodiments of the present invention are capable of detecting SCCP looping, even when the incoming message OPC does not match the outgoing message DPC. In addition, because the loop detection functions perform by embodiments of the present invention depend on the message direction and whether or not an STP is adjacent or non-adjacent, loop detection can be performed without discarding valid messages. Thus, the present invention provides increased versatility over conventional solutions and reduces the likelihood of both SCCP looping and discarding of valid messages.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for detecting signaling connection control part (SCCP) looping in a telecommunications network, the method comprising:
   (a) receiving, at a signaling message routing node, an SCCP message from an originating node;
   (b) performing global title translation (GTT) for the SCCP message and thereby determining a destination point code (DPC) for the signaling message;
   (c) comparing the post-GTT DPC with a first point code stored in a message transfer part (MTP) originating point code (OPC) associated with the SCCP message;
   (d) in response to detecting a match in step (c), identifying the presence of SCCP looping for the SCCP message;
   (e) in response to failing to detect a match in step (c), mapping the first point code to at least one second point code of a plurality of point codes used to identify the originating node;
   (f) comparing the post-GTT DPC to the at least one second point code; and
   (g) in response to detecting a match in step (f), identifying the presence of SCCP looping for the signaling message.

2. The method of claim 1 wherein steps (a)-(g) are performed at a signal transfer point (STP).

3. The method of claim 1 wherein the SCCP message comprises a database query.

4. The method of claim 3 wherein the database query comprises a message requiring local number portability (LNP) message relay service.

5. The method of claim 3 wherein the database query comprises a local number portability (LNP) query.

6. The method of claim 1 wherein mapping the first point code to at least one second point code includes mapping the first point code to a capability point code of the originating node and wherein step (f) includes comparing the post-GTT DPC to the capability point code.

7. The method of claim 1 wherein comparing the post-GTT DPC to the at least one second point code includes:
   (a) determining whether the first point code is associated with an adjacent node or a non-adjacent node;
   (b) determining whether a post-GTT destination for the SCCP message is an adjacent node or a non-adjacent node;
   (c) determining whether the post-GTT destination is in a concurring direction or an opposing direction with respect to a direction from which the SCCP message was received in a predetermined network topology map; and
   (d) using results from the determinations with regard to message direction, message origination adjacency, and message destination adjacency to identify a set of point codes to which the first point code should be mapped; and
   (e) comparing post-GTT DPC to point codes in the set 8. The method of claim 1 wherein mapping the first point code to at least one second point code includes mapping the first point code to a set of capability point codes associated with STPs in addition to the originating node and wherein comparing the post-GTT DPC to the second point code includes comparing the post-GTT DPC to point codes in the set.

9. The method of claim 1 wherein mapping the first point code to at least one second point code Includes mapping the first point code to a set of true point codes associated with STPs in addition to the originating node and wherein comparing the post-GTT DPC to the second point code includes comparing the post-GTT DPC to point codes in the set.

10. A method for identifying and preventing signaling connection control part (SCCP) looping, the method comprising:
    (a) receiving an SS7 signaling message from a first node, the signaling message having an originating point code (OPC), a destination point code (DPC), and a global title address;
    (b) global title translating the global title address to determine a new DPC for the signaling message;
    (c) comparing the OPC to the new DPC to determine whether SCCP looping is present;
    (d) in response to determining that the OPC matches the new DPC, identifying the presence of SCCP looping; and
    (e) in response to determining that the OPC does not match the new DPC, applying SCCP loop detection logic to correlate the OPC or the DPC with one or more additional point codes of plural point codes used to identify an originating or destination node for the signaling message and determining whether SCCP looping is present based on the correlation.

11. The method of claim 10 wherein determining whether SCCP looping is present includes identifying the presence of SCCP looping when a point code to which the OPC correlates matches the DPC or a point code to which the DPC correlates matches the OPC.

12. A method for selective signaling connection control part (SCCP) loop detection, the method comprising:
    (a) receiving an SCCP message including an originating point code (OPC) associated with an originating node;
    (b) global title translating the SCCP message and determining a destination point code (DPC) associated with a destination for the SCCP message;
    (c) correlating the OPC or the DPC to a set including a plurality of point codes used to identify one of the originating and destination nodes, the set being selected based on the originating node, the destination node, and a direction associated with the SCCP message; and
    (d) identifying the presence of SCCP looping based on the OPC or the DPC being equal to a point code in the set of point codes.

13. A signaling message routing node comprising:
    (a) a communications link module for receiving a signaling connection control part (SCCP) message from an originating node;
    (b) a global title translation engine operatively associated with the communications link module for performing global title translation for the SCCP message to produce a destination point code (DPC) for the SCCP message; and
    (c) an SCCP loop detector operatively associated with the global title translation engine for comparing the post-GTT DPC associated with the SCCP message to a first point code stored in a message transfer part (MTP) originating point code (OPC) field associated with the SCCP message, and, in response to detecting a match, for indicating the presence of SCCP looping and, in response to failing to detect a match, for comparing the post-GTT DPC with at least one second point code of a plurality of point codes used to identify the originating node to identify the presence of SCCP looping.

14. The signaling message routing node of claim 13 wherein the communications link module comprises an SS7 communications link module for sending and receiving SS7 messages over an SS7 network.

15. The signaling message routing node of claim 13 wherein the communications link module comprises an IP communications link module for sending and receiving IP-encapsulated SS7 messages over an IP network.

16. The signaling message routing node of claim 13 wherein the global title translation engine is adapted to perform intermediate global title translation of the SCCP message.

17. The signaling message routing node of claim 13 wherein the GTT engine is adapted to perform final global title translation of the SCCP message.

18. The signaling message routing node of claim 13 wherein the SCCP loop detector is adapted to map the first point code to a predetermined set of point codes and to compare the post-GTT DPC with point codes in the set.

19. The signaling message routing node of claim 18 wherein the predetermined set of point codes includes a capability point code of the originating node.

20. The signaling message routing node of claim 18 wherein the predetermined set of point codes includes capability point codes associated with nodes in addition to the originating node.

21. The signaling message routing node of claim 18 wherein the predetermined set of point codes includes true point codes associated with nodes in addition to the originating node.

22. The signaling message routing node of claim 13 wherein the SCCP loop detector in adapted to determine a direction for the SCCP message after global title translation, whether the originating node is adjacent to the signaling message routing node and whether a post-GTT destination for the SCCP message is adjacent to the signaling message routing node.

23. The signaling message routing node of claim 22 wherein the SCCP loop detector is adapted to select the second point code to compare with the post-GTT DPC based on the adjacency and direction determinations.

24. A processor card for detecting signaling connection control part (SCCP) looping in a telecommunications network, the processor card including at least one processor that executes instructions embodied in a computer-readable medium for performing steps comprising:
  (a) receiving, at a signaling message routing node, an SCCP message from an originating node;
  (b) performing global title translation for the SCCP message and thereby determining a destination point code (DPC) for the SCCP message;
  (c) comparing the post-GTT DPC with a first point code stored in a message transfer part (MTP) originating point code (OPC) field associated with the SCCP message;
  (d) in response to detecting a match in step (c), identifying the presence of SCCP looping for the SCCP message;
  (e) in response to failing to detect a match in step (c), mapping the first point code to at least one second point code of a plurality of point codes used to identify the originating code;
  (f) comparing the post-GTT DPC to the at least one second point code; and
  (g) in response to detecting a match in step (f), identifying the presence of SCCP looping for the signaling message.

25. The processor card of claim 24 wherein steps (a)-(g) are performed at a signal transfer point (STP).

26. The processor card of claim 24 wherein the SCCP message comprises a database query.

27. The processor card of claim 26 wherein the database query comprises a message requiring local number portability (LNP) message relay service.

28. The processor card of claim 26 wherein the database query comprises a local number portability (LNP) database query.

29. The processor card of claim 24 wherein mapping the first point code to at least one second point code includes mapping the first point code to a capability point code of the originating node and wherein step (f) includes comparing the post-GTT DPC to the capability point code.

30. The processor card of claim 24 wherein comparing the post-GTT DPC with at least one second point code includes:
  (a) determining whether the first point code is associated with an adjacent node or a non-adjacent node;
  (b) determining whether a post-GTT destination for the SCCP message is an adjacent node or a non-adjacent node;
  (c) determining whether the post-GTT destination is in a concurring direction or an opposing direction with respect to a direction from which the SCCP message was received in a predetermined network topology map;
  (d) using results from the determinations with regard to message direction, message origination adjacency, and message destination adjacency to identify a set of point codes to which the first point code should be mapped; and
  (e) comparing the post-OTT DPC to point codes in the set.

31. The processor card of claim 24 wherein mapping the first point code to at least one second point code includes mapping the first point code to a set of capability point codes associated with STPs other than the originating node and wherein comparing the post-GTT DPC to the second point code includes comparing the post-GTT DPC to point codes in the set.

32. The processor card of claim 24 wherein mapping the first point code to at least one second point code includes mapping the first point code to a set of true point codes associated with STPs other than the originating node and wherein comparing the post-GTT DPC to the second point code includes comparing the post-GTT DPC to point codes in the set.

33. A processor card for identifying and preventing signaling connection control part (SCCP) looping, the the processor card including at least one processor that executes instructions embodied in a computer-readable medium for performing steps comprising:
  (a) receiving an SS7 signaling message from a first node, the signaling message having an originating point code (OPC), a destination point code (DPC), and a global title address;
  (b) global title translating the global title address to determine a new DPC for the signaling message;
  (c) comparing the OPC to the new DPC to determine whether SCCP looping is present;
  (d) in response to determining that the OPC matches the new DPC, identifying the presence of SCCP looping; and
  (e) in response to determining that the OPC does not match the new DPC, applying SCCP loop detection logic to correlate the OPC or the DPC with one or more additional point codes of plural point codes used to identify an originating or destination node for the signaling message and determining whether SCCP looping is present based on the correlation.

34. The processor card of claim 33 wherein determining whether SCCP looping is present includes identifying SCCP looping when a point code to which the GPO correlates matches the DPC or a point code to which the DPC correlates matches the OPC.

35. A processor card for selective signaling connection control part (SCCP) loop detection, the the processor card including at least one processor that executes instructions embodied in a computer-readable medium for performing steps comprising:
  (a) receiving an SCCP message including an originating point code (OPC) associated with an originating node;
  (b) global title translating the SCCP message and determining a destination point code (DPC) associated with a destination for the SCCP message;
  (c) correlating the OPC or the DPC to a set including a plurality of point codes used to identify one of the originating and destination nodes, the set being selected based on the originating node, the destination node, and a direction associated with the SCCP message; and
  (d) identifying the presence of SCCP looping based on the OPC or the DPC being equal to a point code in the set of point codes.

* * * * *